United States Patent
Yamaguchi

(10) Patent No.: US 8,310,908 B2
(45) Date of Patent: Nov. 13, 2012

(54) SPHERICAL ABERRATION CORRECTION APPROPRIATE POSITION SEARCH APPARATUS, AND SPHERICAL ABERRATION CORRECTION APPROPRIATE POSITION SEARCH METHOD

(75) Inventor: Takahiro Yamaguchi, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/297,800

(22) Filed: Nov. 16, 2011

(65) Prior Publication Data
US 2012/0057441 A1 Mar. 8, 2012

Related U.S. Application Data

(63) Continuation of application No. PCT/JP2010/006348, filed on Oct. 27, 2010.

(30) Foreign Application Priority Data

Apr. 13, 2010 (JP) ................................. 2010-092005

(51) Int. Cl.
*G11B 11/00* (2006.01)
(52) U.S. Cl. ................................ 369/53.25; 369/112.23
(58) Field of Classification Search .................. None
See application file for complete search history.

(56) References Cited

U.S. PATENT DOCUMENTS

| | | | |
|---|---|---|---|
| 2007/0206459 A1* | 9/2007 | Iwamoto et al. | 369/44.29 |
| 2008/0212418 A1* | 9/2008 | Nagata et al. | 369/44.32 |
| 2009/0303847 A1* | 12/2009 | Ishikawa et al. | 369/44.32 |
| 2010/0118667 A1* | 5/2010 | Fukui | 369/44.11 |

FOREIGN PATENT DOCUMENTS
JP 3765235 2/2006
* cited by examiner

*Primary Examiner* — Paul Huber
(74) *Attorney, Agent, or Firm* — McDermott Will & Emery LLP

(57) ABSTRACT

A focus error amplitude obtaining device is configured to obtain amplitudes of a focus error signal. An error amplitude difference calculation device is configured to calculate an error amplitude difference which is a difference between the amplitudes of the focus error signal obtained at two different positions in a moving range of a spherical aberration correction device. An appropriate position search control device is in charge of overall control of structural elements; spherical aberration correction device movement control device, focus error amplitude obtaining device, and error amplitude difference calculation device. The appropriate position search control device decides an appropriate position of the spherical aberration correction device based on the error amplitude difference.

16 Claims, 13 Drawing Sheets position of spherical
aberration correction device position of spherical
aberration correction device

SPHERICAL ABERRATION CORRECTION APPROPRIATE POSITION SEARCH APPARATUS, AND SPHERICAL ABERRATION CORRECTION APPROPRIATE POSITION SEARCH METHOD

RELATED APPLICATIONS

This application is a continuation of PCT International Application PCT/JP2010/006348 filed on Oct. 27, 2010, which claims priority to Japanese Patent Application No. 2010-092005 filed on Apr. 13, 2010. The disclosures of these applications including the specifications, the drawings, and the claims are hereby incorporated by reference in their entirety.

FIELD OF THE INVENTION

The present invention relates to a spherical aberration correction appropriate position search apparatus configured to search prior to signal reproduction an appropriate position where a spherical aberration correction device should be positioned to correct spherical aberration relative to an object lens of an optical pickup for reproducing information of an optical disc which is an information recording medium, more particularly to a technology for improving a degree of accuracy in searching the appropriate position for correction.

BACKGROUND OF THE INVENTION

The short wavelength blue semiconductor laser was recently introduced into the market for practical use, and BD (blue-ray disc) having such a larger storage capacity as 25 GB or more is now prevailing over DVD (digital versatile disc) with the storage capacity of 4.7 GB. The technical merits of BD are; the blue semiconductor laser having the wavelength of 405 nm is used in place of the conventional 650-nm red semiconductor laser to make a laser spot on an optical disc smaller, and NA (Numeral Aperture) of an object lens used to narrow down the laser spot on the optical disc, which is conventionally "0.6" in DVD, is increased to "0.85" in BD. The synergy effect of these technical merits has accomplished such a large storage capacity.

As a result of NA of the object lens thus increased, the problem of spherical aberration, which is a difference between an ideal focal point and an actual focal point of laser transmitting through an optical system, becomes markedly noticeable. The spherical aberration, which is generated by the thickness error of a cover layer of the optical disc, is in proportion to the fourth power of NA, meaning that the problem of spherical aberration may become more noticeable depending on the structure of DVD. In optical discs which require a very high NA such as BD, a standardized cover layer thickness is 0.1 mm, and a thickness error tolerance is equal to 10 μm or less. Therefore, the spherical aberration is variable in different optical discs, making it necessary to correct the spherical aberration of each optical disc independently in an optical pickup. Conventionally, the spherical aberration is mostly corrected by mechanically operating a spherical aberration correction device including a spherical aberration correction lens. The spherical aberration correction device is provided between a laser light source and an object lens to be movable by a lens drive unit equipped with, for example, a stepping motor.

This section describes the performance of the spherical aberration correction device in responsiveness to temperature variation. For price reduction, a plastic lens is most often used in the spherical aberration correction device. The plastic lens, however, is likely to decrease its index of refraction with temperature rise, and overly low index of refraction is detrimental to recording and reproduction qualities. In order to control the thickness error of the cover layer and minimize the influences from temperature variation to reliably accomplish good recording and reproduction qualities, it is necessary to constantly move the spherical aberration correction device to an appropriate position at the time. Therefore, conventional optical disc recording and reproduction apparatuses usually obtain an ambient temperature using a temperature sensor and move the spherical aberration correction device to an appropriate position corresponding to the obtained ambient temperature before starting to read signals. However, it invites cost increase to provide the temperature sensor. To dispense with the temperature sensor, it is preferable to measure the spherical aberration by some kind of method and adjust the position where the spherical aberration correction device should be positioned based on the measured spherical aberration. A conventional well-known technique, though only applicable when signals can be read from an optical disc, is to find a position of the spherical aberration correction device where the best signal quality is obtained because of a close relationship between the spherical aberration and the quality of signals read from the optical disc.

To read signals from an optical disc, it is necessary to adjust a laser focal point on the optical disc by driving an object lens, which is called a focus operation. The focus operation needs a focus error signal. The spherical aberration is a bottleneck in generating the focus error signal in good condition. Therefore, the spherical aberration correction device should be positionally adjusted before signals are read from the optical disc to lessen the spherical aberration to such an extent that does not affect the focus operation. When the position the spherical aberration correction device is thus searched based on the signal quality, however, it is not possible to correct the spherical aberration in a stage where signals have not been read from the optical disc. There are the prior arts disclosed in the Patent Document 1 to solve the technical problem; detecting the spherical aberration using a focus balance difference which is a difference between absolute values of positive and negative peaks of the focus error signal (hereinafter, called prior art 1), and detecting the spherical aberration using an interval between positions where the positive and negative peaks are detected (hereinafter, called prior art 2).

PRIOR ART DOCUMENT

Patent Document

Patent Document 1: Japanese Patent No. 3765235

SUMMARY OF THE INVENTION

Problem to be Solved by the Invention

The prior art 1 demands that favorable characteristics having a remarkable linearity as illustrated in C1 of FIG. 8 be met in a relationship between the position of the spherical aberration correction device and focus balance. But the fact is that such favorable characteristics are hardly met in many optical disc recording and reproduction apparatuses due to optical differences, characteristics and/or mounting variability of optical detector, or tilt of object lens or optical disc. The prior art 1, therefore, fails to accurately detect the spherical aberration.

The prior art 2 calculates the interval between the detection positions based on a drive value of the object lens. However, the drive value and an actual position are largely variable due to hardware factor. In fact, it is not possible to accurately calculate the distance between the peak-detected positions based on the drive value of the object lens. Thus, the prior art 2 similarly fails to accurately detect the spherical aberration.

The present invention was accomplished to solve the conventional problems, and a main object thereof is to provide a spherical aberration correction appropriate position search apparatus and a spherical aberration correction appropriate position search method, which both ensure a high degree of accuracy in searching an appropriate position of a spherical aberration correction device relative to an object lens of an optical pickup.

Means for Solving the Problem

The present invention achieves the object by taking the following measures. The bracketed numerals, [1], [2], [3] . . . , respectively correspond to claim numbers recited in the Scope of Claims. The bracketed numbers are not necessarily serial numbers in the description given below and may be skipped or recited in reversed orders. An optical disc reproduction apparatus provided with a spherical aberration correction appropriate position search apparatus according to the present invention may or may not have a recording function.

[1] The spherical aberration correction appropriate position search apparatus according to the present invention has the following structural elements, which are described referring to FIG. 1.

The present invention uses an error amplitude difference $\Delta A$ in place of focus balance. The error amplitude difference $\Delta A$ is a difference between two amplitudes A1 and A2 of a focus error signal measured at two different positions (A1−A2) in a moving range of a spherical aberration correction device E0. The error amplitude difference $\Delta A$ is different to a difference between maximum and minimum values of a focus error signal in the event of focus balance. The maximum and minimum values of a focus error signal do not include positional information as to the moving range of the spherical aberration correction device E0, whereas the error amplitude difference $\Delta A$ includes the positional information. There tends to be more approximation between the product reality and ideal technical concept in characteristics of correlation between the amplitudes A of the focus error signal and the spherical aberration than in characteristics of correlation between the spherical aberration and focus balance (see FIG. 9 illustrating an exemplary embodiment, which will be described later). Therefore, it can be estimated from the difference $\Delta A$ between two amplitudes A1 and A2 of the focus error signal (error amplitude difference) whether a position where the moved spherical aberration correction device E0 is currently positioned is an appropriate position (see FIG. 10 illustrating the exemplary embodiment, which will be described later. It is determined that the spherical aberration correction device E0 is currently at an appropriate position as far as the position is included in the range of characteristics of correlation between the amplitudes A of the focus error signal and the spherical aberration including a peak thereof.

The spherical aberration correction appropriate position search apparatus according to the present invention is provided with: a spherical aberration correction device movement control device E1 configured to control movement of a spherical aberration correction device E0; a focus error amplitude obtaining device E2 configured to obtain amplitudes A of a focus error signal; and an error amplitude difference calculation device E3 configured to calculate an error amplitude difference $\Delta A$ which is a difference between first and second amplitudes A1 and A2 of the focus error signal obtained at two different positions by the focus error amplitude obtaining device E2. To search an appropriate position of the spherical aberration correction device E0, the spherical aberration correction appropriate position search apparatus is further provided with an appropriate position search control device E4 in charge of overall control of the spherical aberration correction device movement control device E1, focus error amplitude obtaining device E2, and error amplitude difference calculation device E3.

The appropriate position search control device E4 control these devices as described below. The appropriate position search control device E4 makes the spherical aberration correction device movement control device E1 move the spherical aberration correction device E0 to a first measurement position z1. Then, the appropriate position search control device E4 makes the focus error amplitude obtaining device E2 obtain the first amplitude A1 of the focus error signal at the first measurement position z1 of the spherical aberration correction device E0. Then, the appropriate position search control device E4 makes the spherical aberration correction device movement control device E1 move the spherical aberration correction device E0 to a second measurement position z2, and makes the focus error amplitude obtaining device E2 obtain the second amplitude A2 of the focus error signal at the second measurement position z2 of the spherical aberration correction device E0. Then, the appropriate position search control device E4 makes the error amplitude difference calculation device E3 calculate the error amplitude difference $\Delta A$ between the first amplitude A1 and the second amplitude A2 (=A1−A2 or =A2−A1). The appropriate position search control device E4 determines whether the obtained error amplitude difference $\Delta A$ is included in a predefined threshold range. When determined that the obtained error amplitude difference $\Delta A$ is not included in the predefined threshold range, the appropriate position search control device E4 makes the spherical aberration correction device movement control device E1 displace at least one of the first measurement position z1 and the second measurement position z2. Then, the appropriate position search control device E4 repeats the processing steps thus described. When determined that the obtained error amplitude difference $\Delta A$ is included in the predefined threshold range, the first measurement position z1, the second measurement position z2, or an intermediate position between the first measurement position z1 and the second measurement position z2 is decided as the appropriate position to correct the spherical aberration at the time.

The error amplitude difference $\Delta A$ between two amplitudes A1 and A2 of the focus error signal measured at two different positions z1 and z2 include positional information as to the moving range of the spherical aberration correction device E0. When the error amplitude difference $\Delta A$ is used as a factor for determining the appropriate position, therefore, the appropriate position of the spherical aberration correction device E0 where the spherical aberration should be corrected can be easily and accurately calculated.

Summarizing the description given so far, an spherical aberration correction appropriate position search apparatus according to the present invention comprises:

a spherical aberration correction device movement control device E1 configured to control movement of a spherical aberration correction device E0 for correcting spherical aberration of an object lens which collects a laser on an optical disc by moving toward or away from the object lens;

a focus error amplitude obtaining device E2 configured to obtain amplitudes A of a focus error signal indicating a distance between a focal point of the laser by the object lens and a signal recording surface of the optical disc;

an error amplitude difference calculation device E3 configured to calculate an error amplitude difference ΔA which is a difference between first and second amplitudes A1 and A2 of the focus error signal (=A1−A2 or =A2−A1) obtained by the focus error amplitude obtaining device E2 at two different positions in a moving range of the spherical aberration correction device E0; and an appropriate position search control device E4 in charge of overall control of the spherical aberration correction device movement control device E1, the focus error amplitude obtaining device E2, and the error amplitude difference calculation device E3, wherein the appropriate position search control device E4 decides an appropriate position of the spherical aberration correction device E0 based on the error amplitude difference ΔA.

According to the spherical aberration correction appropriate position search apparatus thus technically characterized, wherein the error amplitude difference ΔA between two amplitudes of the focus error signal obtained at two different positions in the moving range of the spherical aberration correction device E0 is used, an appropriate position of the spherical aberration correction device E0 to correct the spherical aberration can be very accurately detected even if an optical disc reproduction apparatus which is a correction object of the spherical aberration correction appropriate position search apparatus according to the present invention is characterized such that the spherical aberration cannot be identified by focus balance. To obtain such an operational effect, the present invention takes advantage of the fact that the error amplitude difference ΔA is adequately small as far as the appropriate position of the spherical aberration correction device E0 is included in the moving range thereof. Therefore, when the spherical aberration correction device E0 is positionally controlled based on the appropriate position searched and obtained by the spherical aberration correction appropriate position search apparatus, the spherical aberration correction device E0 can be moved to the appropriate position where the spherical aberration should be corrected.

[3] The amplitudes A of the focus error signal reply upon an index of reflection of the optical disc and a laser power. Therefore, the error amplitude difference ΔA between two amplitudes of the focus error signal inevitably includes elements other than the spherical aberration. When the error amplitude difference ΔA is directly used, the appropriate position search is not as accurate as expected. The following technical feature is provided to better the accuracy.

The error amplitude difference ΔA is a difference between the first amplitude A1 of the focus error signal at the first measurement position z1 and the second amplitude A2 of the focus error signal at the second measurement position z2, therefore, ΔA=A1−A2 (or ΔA=A2−A1). The difference ΔA is divided by the sum of the amplitudes A1 and A2 to be normalized. The normalized error amplitude difference ΔN is;

$$\Delta N = (A1 - A2)/(A1 + A2) \quad 1)$$

The divider is not necessarily limited to (A1+A2), and may be the sum of any element values relevant to the amplitudes A1 and A2.

The spherical aberration correction appropriate position search apparatus normalizes the error amplitude difference ΔA and uses the normalized error amplitude difference ΔN in place of directly using the error amplitude difference ΔA in addition to the technical feature of [1]. More specifically describing the additional technical feature referring to FIG. 2, the spherical aberration correction appropriate position search apparatus comprising the structural elements illustrated in FIG. 1 further comprises an error amplitude difference normalization device E5 configured to normalize the error amplitude difference ΔA to obtain the normalized error amplitude difference ΔN, wherein the appropriate position search control device E4 decides the appropriate position of the spherical aberration correction device E0 based on the normalized error amplitude difference ΔN obtained by the error amplitude difference normalization device E5.

[9] A spherical aberration correction appropriate position search method according to the present invention comparable to the spherical aberration correction appropriate position search apparatus recited in [1] comprises:

a first step for moving a spherical aberration correction device E0 to a first measurement position z1, the spherical aberration correction device E0 being configured to correct spherical aberration of an object lens which collects a laser on an optical disc by moving toward or away from the object lens;

a second step for obtaining a first amplitude A1 of a focus error signal indicating a distance between a focal point of the laser by the object lens and a signal recording surface of the optical disc when the spherical aberration correction device E0 is positioned at the first measurement position z1;

a third step for moving the spherical aberration correction device E0 to a second measurement position z2;

a fourth step for obtaining a second amplitude A2 of the focus error signal when the spherical aberration correction device E0 is positioned at a second measurement position z2;

a fifth step for calculating an error amplitude difference ΔA which is a difference between the first and second amplitudes A1 and A2;

a sixth step for determining whether the error amplitude difference ΔA is included in a predefined threshold range;

a seventh step for displacing at least one of the first measurement position z1 and the second measurement position z2 when the sixth step determines that the error amplitude difference ΔA is not included in the predefined threshold range and then repeating the first-sixth steps; and an eighth step for deciding the first measurement position z1, the second measurement position z2, or an intermediate position between the first measurement position z1 and the second measurement position z2 as an appropriate position of the spherical aberration correction device E0 when the sixth step determines that the error amplitude difference ΔA is included in the predefined threshold range.

[10] A spherical aberration correction appropriate position search method according to the present invention comparable to the spherical aberration correction appropriate position search apparatus recited in [3] is the spherical aberration correction appropriate position search method recited in [9] further including a step for feeding a normalized error amplitude difference ΔN obtained by normalizing the error amplitude difference ΔA to the sixth step in place of the error amplitude difference ΔA.

More specifically, the spherical aberration correction appropriate position search method comprises:

a first step for moving a spherical aberration correction device E0 to a first measurement position z1, the spherical aberration correction device E0 being configured to correct spherical aberration of an object lens which collects a laser on an optical disc by moving toward or away from the object lens;

a second step for obtaining a first amplitude A1 of a focus error signal indicating a distance between a focal point of the laser by the object lens and a signal recording surface of the optical disc when the spherical aberration correction device E0 is positioned at the first measurement position z1;

a third step for moving the spherical aberration correction device E0 to a second measurement position z2;

a fourth step for obtaining a second amplitude A2 of the focus error signal when the spherical aberration correction device E0 is positioned at the second measurement position z2;

a fifth step for calculating an error amplitude difference ΔA which is a difference between the first and second amplitudes A1 and A2 (=A1−A2 or =A2−A1);

a sixth step for obtaining a normalized error amplitude difference ΔN by normalizing the error amplitude difference ΔA;

a seventh step for determining whether the normalized error amplitude difference ΔN is included in a predefined threshold range;

an eighth step for displacing at least one of the first measurement position z1 and the second measurement position z2 when the seventh step determines that the normalized error amplitude difference ΔN is not included in the predefined threshold range and then repeating the first-seventh steps; and a ninth step for deciding the first measurement position z1, the second measurement position z2, or an intermediate position between the first measurement position z1 and the second measurement position z2 as an appropriate position of the spherical aberration correction device E0 when the seventh step determines that the normalized error amplitude difference ΔN is included in the predefined threshold range.

Because the method recited in [10] comprises more steps than the method recited in [9], some of the respective steps of the method recited in [10] are renumbered.

Effect of the Invention

The present invention uses the error amplitude difference generated between two amplitudes of the focus error signal obtained at two different positions of the spherical aberration correction device, thereby more accurately calculating the appropriate position of the spherical aberration correction device. As a result, the spherical aberration correction device can improve a degree of accuracy in correcting the spherical aberration. The present invention thus capable of improving the correction accuracy without using a temperature sensor can provide a competitive apparatus in terms of manufacturing costs.

MODES FOR CARRYING OUT THE INVENTION

Figure 1:
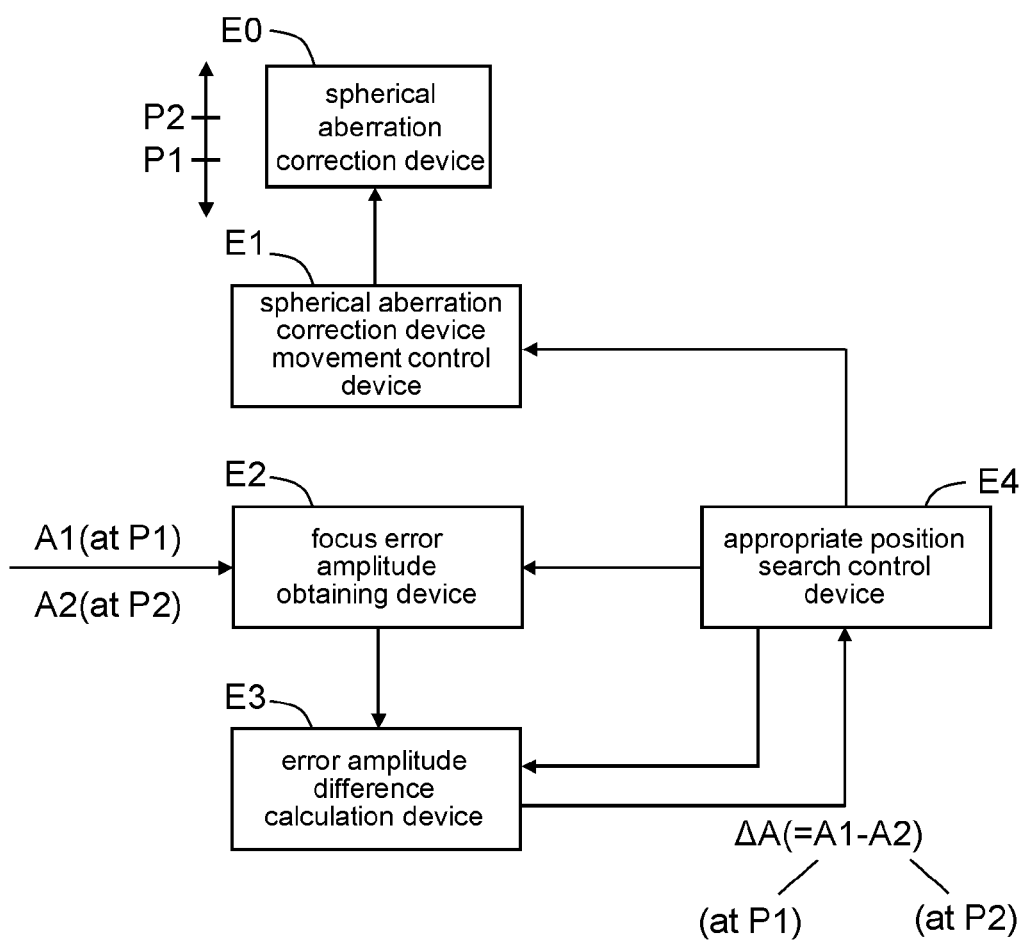
FIG. 1 is a block diagram (1) illustrating a basic structure of a spherical aberration correction appropriate position search apparatus according to the present invention.
Figure 2:
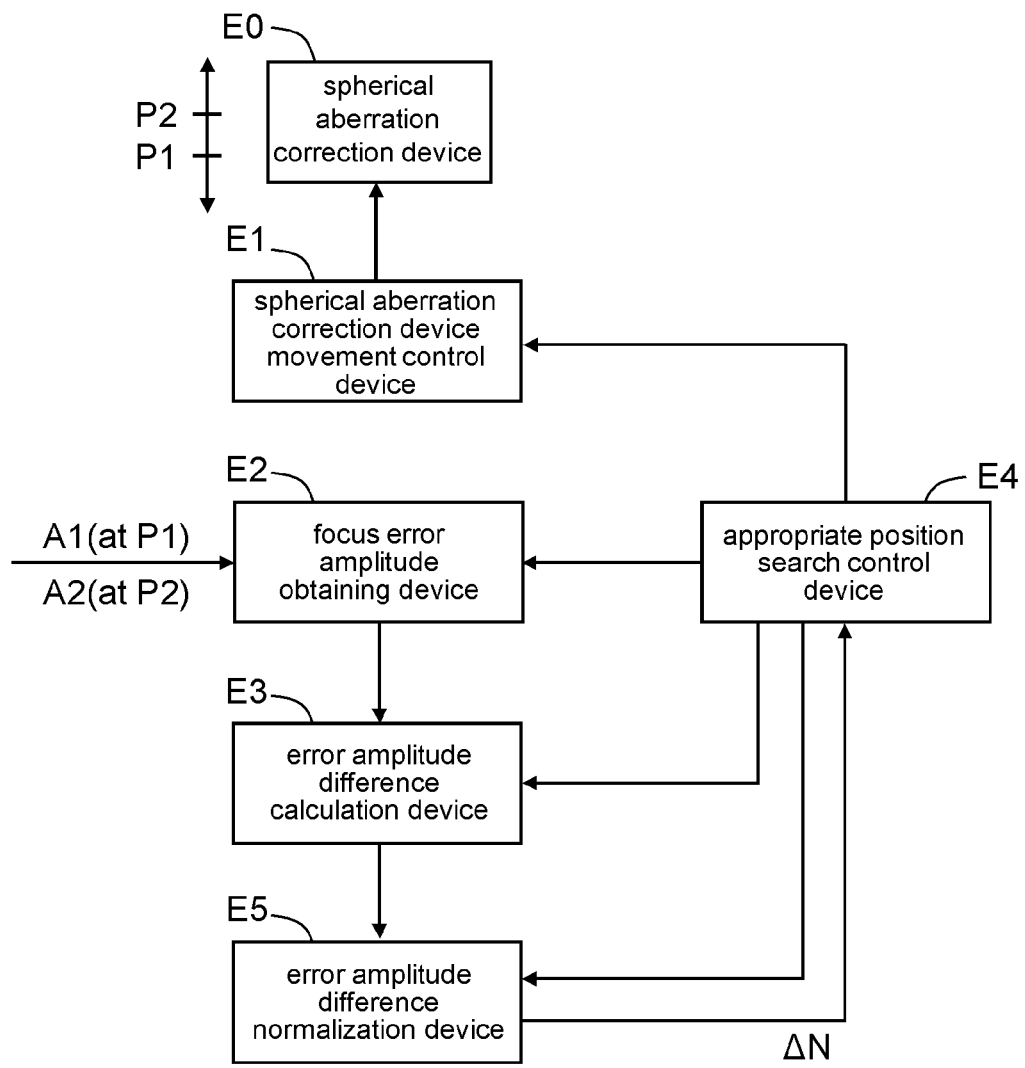
FIG. 2 is a block diagram (2) illustrating a basic structure of a spherical aberration correction appropriate position search apparatus according to the present invention.

The spherical aberration correction appropriate position search apparatuses and the spherical aberration correction appropriate position search methods recited in [1], [3], [9], and [10] may be configured to be more technically advantageous as described below.

[2] The appropriate position search control device E4 recited in [1] is preferably configured to execute:

a first process for making the spherical aberration correction device movement control device E1 move the spherical aberration correction device E0 to a first measurement position z1;

a second process for making the focus error amplitude obtaining device E2 obtain a first amplitude A1 of the focus error signal when the spherical aberration correction device E0 is positioned at the first measurement position z1;

a third process for making the spherical aberration correction device movement control device E1 move the spherical aberration correction device E0 to a second measurement position z2;

a fourth process for making the focus error amplitude obtaining device E2 obtain a second amplitude A2 of the focus error signal when the spherical aberration correction device E0 is positioned at the second measurement position z2;

a fifth process for making the error amplitude difference calculation device E3 calculate an error amplitude difference ΔA which is a difference between the first amplitude A1 and the second amplitude A2 (=A1−A2);

a sixth process for determining whether the error amplitude difference ΔA is included in a predefined threshold range;

a seventh process for making the spherical aberration correction device movement control device E1 displace at least one of the first measurement position z1 and the second measurement position z2 when the sixth process determines that the error amplitude difference ΔA is not included in the predefined threshold range and then repeating the first-sixth processes; and an eighth process for deciding the first measurement position z1, the second measurement position z2, or an intermediate position between the first measurement position z1 and the second measurement position z2 as the appropriate position of the spherical aberration correction device E0 when the sixth process determines that the error amplitude difference ΔA is included in the predefined threshold range.

The appropriate position search control device E4 recited in [3] is preferably configured to execute:

a first process for making the spherical aberration correction device movement control device E1 move the spherical aberration correction device E0 to a first measurement position z1;

a second process for making the focus error amplitude obtaining device E2 obtain a first amplitude A1 of the focus error signal when the spherical aberration correction device E0 is positioned at the first measurement position z1;

a third process for making the spherical aberration correction device movement control device E1 move the spherical aberration correction device E0 to a second measurement position z2;

a fourth process for making the focus error amplitude obtaining device E2 obtain a second amplitude A2 of the focus error signal when the spherical aberration correction device E0 is positioned at the second measurement position z2;

a fifth process for making the error amplitude difference calculation device E3 calculate an error amplitude difference ΔA which is a difference between the first amplitude A1 and the second amplitude A2 (=A1−A2);

a sixth process for making the error amplitude difference normalization device E5 normalize the error amplitude difference ΔA;

a seventh process for determining whether the normalized error amplitude difference ΔN obtained in the sixth process is included in a predefined threshold range;

an eighth process for displacing at least one of the first measurement position z1 and the second measurement position z2 when the seventh process determines that the normalized error amplitude difference ΔN is not included in the predefined threshold range and then repeating the first-seventh processes; and a ninth process for deciding the first measurement position z1, the second measurement position z2, or an intermediate position between the first measurement position z1 and the second measurement position z2 as an appropriate position of the spherical aberration correction device E0 when the seventh process determines that the normalized error amplitude difference ΔN is included in the predefined threshold range.

Figure 13:
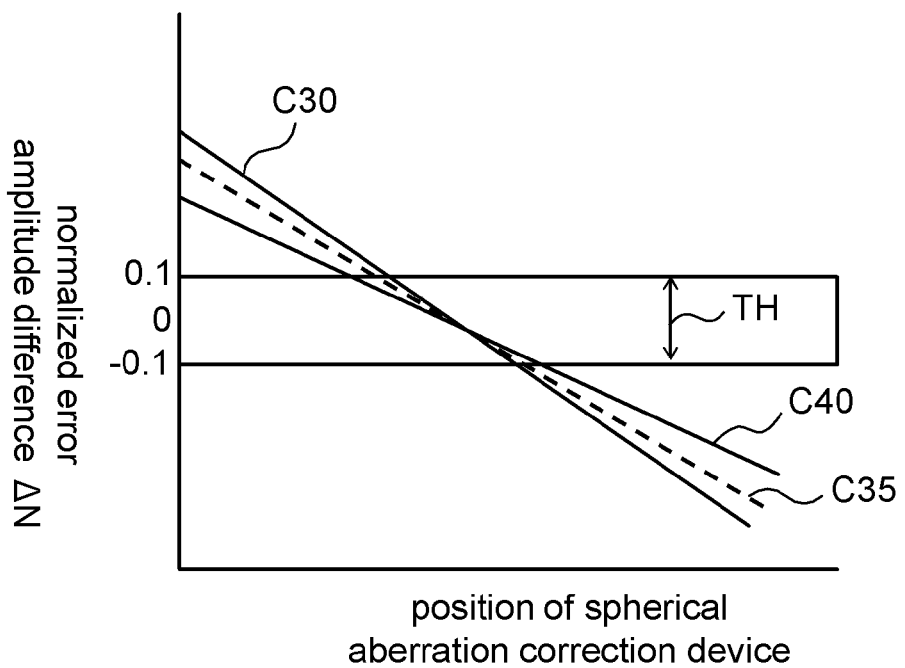
FIG. 13 is an illustration of characteristics of correlation between lens positions of spherical aberration and a normalized error amplitude difference according to the exemplary embodiment according to the exemplary embodiment.

According to the technical features recited in [3] and [4], any influences resulting from a degree of reflection of the optical disc and a laser power are removed from the normalized error amplitude difference ΔN as compared to the error amplitude difference ΔA (see FIG. 13 illustrating the embodiment, which will be described later). This makes the decision more accurate, thereby less frequently repeating the processes. Accordingly, it takes less time to converge the search of the appropriate position of the spherical aberration correction device E0, resulting in reduction of an overall processing time.

Figure 3:
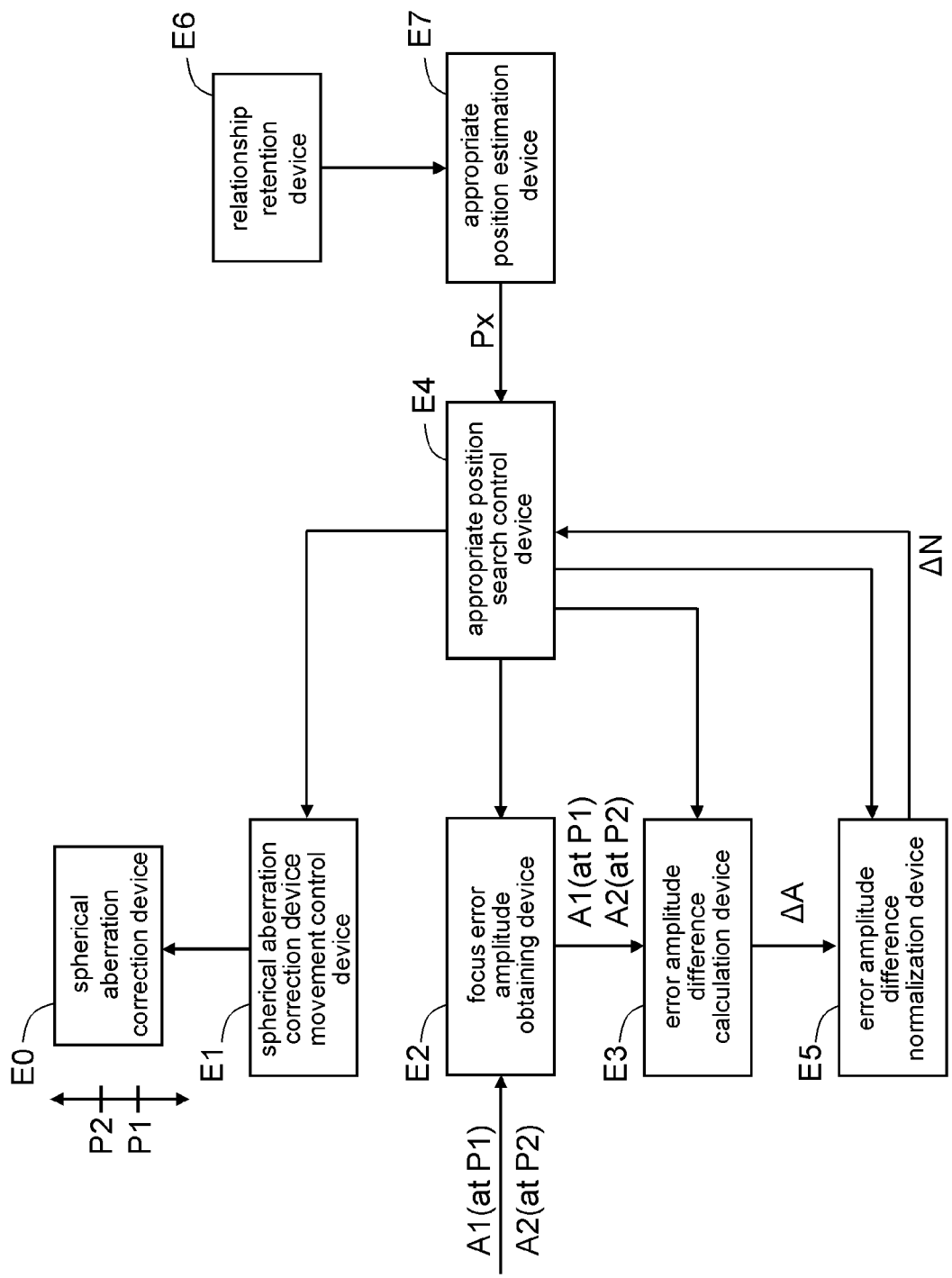
FIG. 3 is a block diagram (3) illustrating a basic structure of a spherical aberration correction appropriate position search apparatus according to the present invention.
Figure 10:
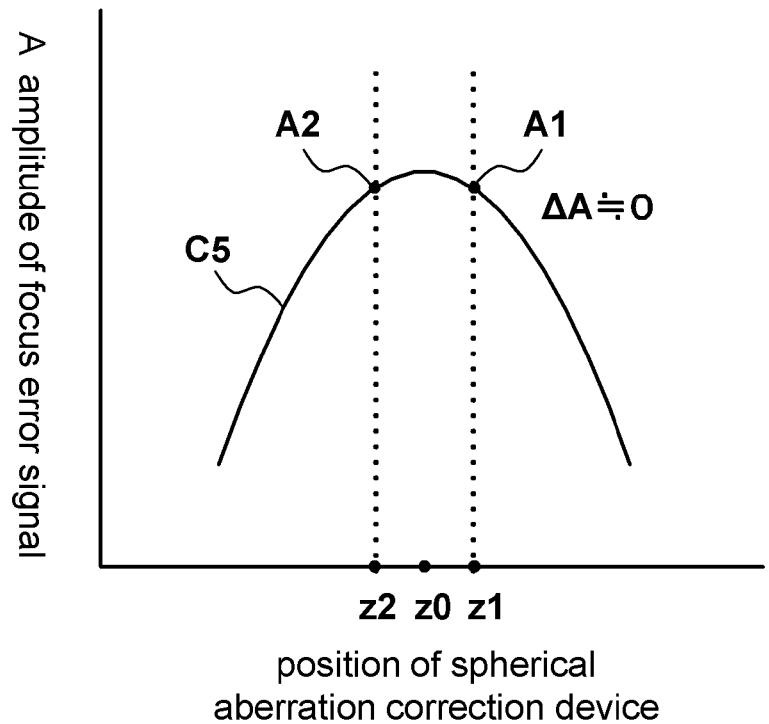
FIG. 10 is an illustration of characteristics of correlation between amplitudes of a focus error signal at normal temperature and positions of a spherical aberration correction device according to the exemplary embodiment.
Figure 11:
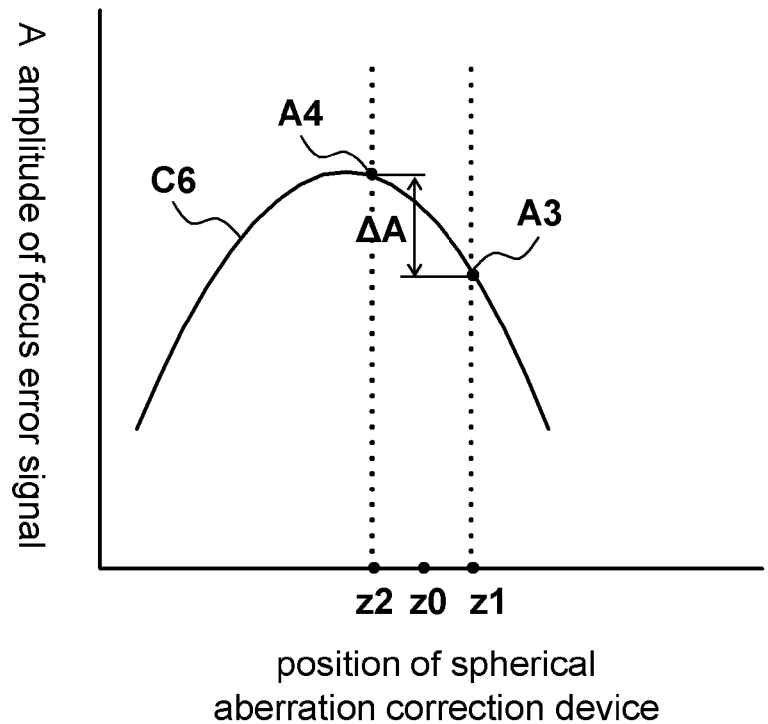
FIG. 11 is an illustration of characteristics of correlation between amplitudes of a focus error signal and positions of a spherical aberration correction device at any temperatures but normal temperature according to the exemplary embodiment.
Figure 14:
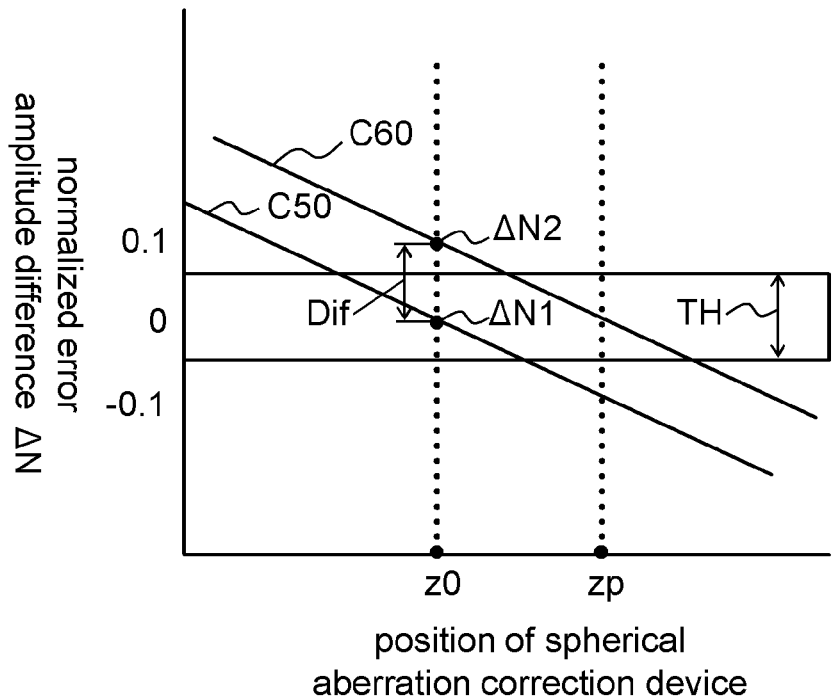
FIG. 14 is an illustration of characteristics of correlation between a normalized error amplitude difference at normal temperature and positions of a spherical aberration correction device and characteristics of correlation between a normalized error amplitude difference at any temperatures but normal temperature and positions of a spherical aberration correction device according to the exemplary embodiment.

[5, 6] The main feature of [5, 6] is to append temperature-dependent influences, which is hereinafter described referring to FIG. 3. The error amplitude difference ΔA may be variable depending on an ambient temperature even when the spherical aberration correction device E0 is staying at the same position. The variation affecting the normalized error amplitude difference ΔN results in shift of characteristic curves substantially in parallel in the axial direction of the normalized error amplitude difference ΔN (see FIG. 14 illustrating the embodiment, which will be described later). The variation affecting the error amplitude difference ΔA results in axial shift of characteristic curves substantially in parallel in the moving direction of the spherical aberration correction device E0 (see FIGS. 10 and 11 illustrating the embodiment, which will be described later). Whether normalized or not normalized, the parallel shift is called in this description a relationship of the appropriate position of the spherical aberration correction device E0 relative to the error amplitude difference ΔA or the normalized error amplitude difference ΔN. The relationship can be expressed in an equation or tabulated. As far as the relationship is understood, whenever the error amplitude difference ΔA or the normalized error amplitude difference ΔN is not included in the predefined threshold range, the appropriate position of the spherical aberration correction device E0 can be estimated by an arithmetic operation based on the relationship. To estimate the appropriate position, it is necessary to provide a relationship retention device E6 configured to retain beforehand the relationship of the appropriate position of the spherical aberration correction device E0 relative to the error amplitude difference ΔA or the normalized error amplitude difference ΔN. Further, it is necessary to provide an appropriate position estimation device E7 configured to estimate the appropriate position of the spherical aberration correction device E0 by performing the arithmetic operation based on the relationship retained in the relationship retention device E6 whenever the error amplitude difference ΔA or the normalized error amplitude difference ΔN is not included in the predefined threshold range. The information of the appropriate position estimated by the appropriate position estimation device E7 (estimation result) is inputted to the appropriate position search control device E4. Then, the appropriate position search control device E4, spherical aberration correction device movement control device E1, focus error amplitude obtaining device E2, and error amplitude difference calculation device E3 repeatedly execute a sequence of processing steps as described earlier.

Summarizing the description, the spherical aberration correction appropriate position search apparatus thus technically characterized is the spherical aberration correction appropriate position search apparatus recited in [1] further comprising:

a relationship retention device E6 configured to retain beforehand a relationship of the appropriate position of the spherical aberration correction device E0 relative to the error amplitude difference $\Delta A$ or the normalized error amplitude difference $\Delta N$ at normal temperature; and an appropriate position estimation device E7 configured to estimate an appropriate position zp of the spherical aberration correction device E0 using the relationship when the error amplitude difference $\Delta A$ or the normalized error amplitude difference $\Delta N$ is not included in the predefined threshold range.

Thus configured, the appropriate position of the spherical aberration correction device E0 can be searched based on the estimation result. Then, the search process can be very accurate irrespective of variability of the ambient temperature, and it takes less time to converge the search of the appropriate position of the spherical aberration correction device E0.

[11, 12] A spherical aberration correction appropriate position search method according to the present invention comparable to the spherical aberration correction appropriate position search apparatus recited in [5, 6] is the spherical aberration correction appropriate position search method recited in [9] or [10], further comprising:

a ninth step or a tenth step for retaining beforehand a relationship of the error amplitude difference $\Delta A$ or the normalized error amplitude difference $\Delta N$ at normal temperature relative to the appropriate position of the spherical aberration correction device E0 in the error amplitude difference $\Delta A$ or the normalized error amplitude difference $\Delta N$ at normal temperature, wherein the seventh step or the eight step estimates an appropriate position zp of the spherical aberration correction device E0 based on the relationship to output a feedback of the estimated appropriate position.

Figure 4:
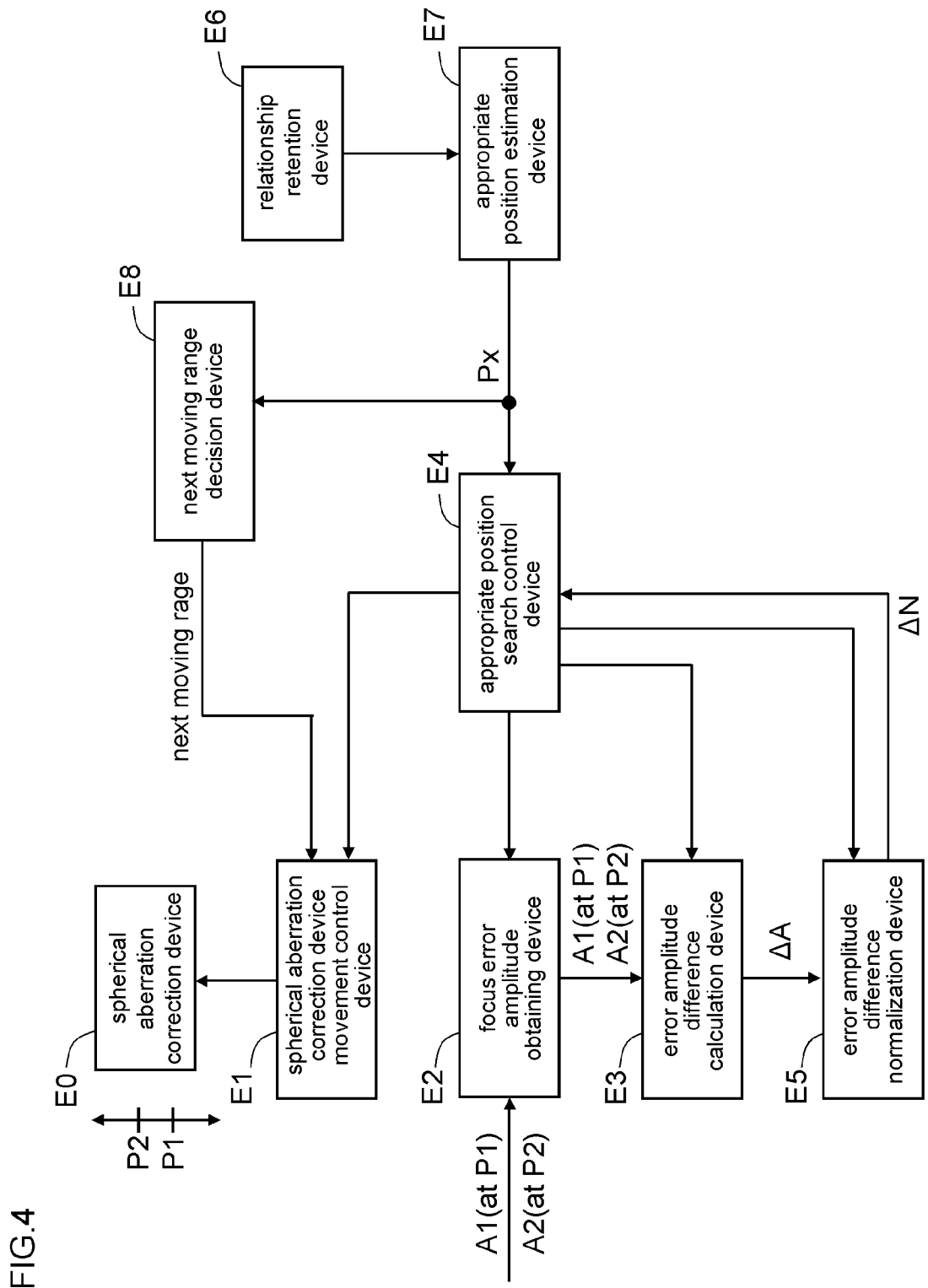
FIG. 4 is a block diagram (4) illustrating a basic structure of a spherical aberration correction appropriate position search apparatus according to the present invention.
Figure 15:
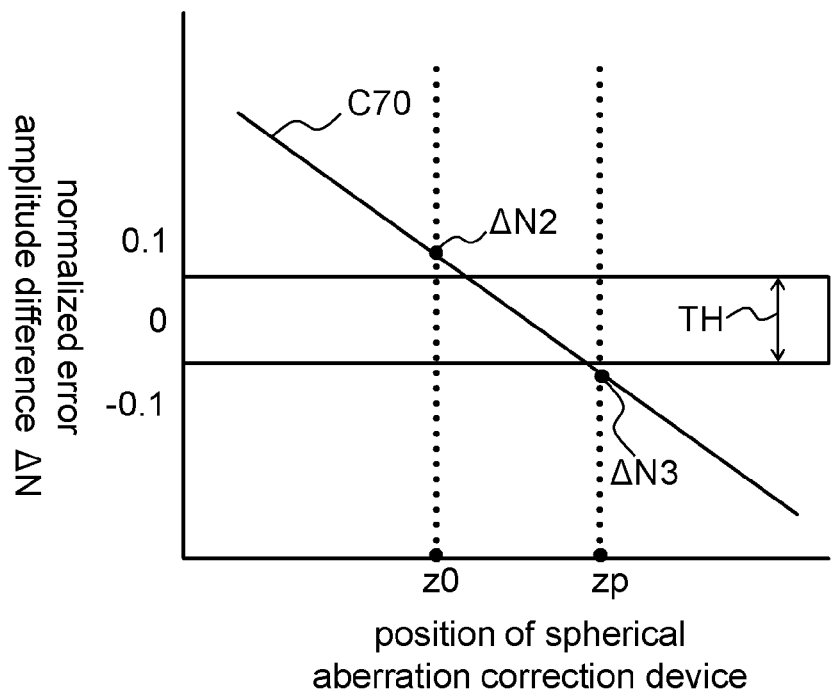
FIG. 15 is an illustration of characteristics of correlation between amplitudes of a focus error signal and positions of a spherical aberration correction device in an environment where there is more variability of tilt than a tilt of approximate expression according to the exemplary embodiment.

[7, 8] A description is given referring to FIG. 4. A next moving range decision device E8 is further provided in the apparatus of [5, 6]. The next moving range decision device E8 is configured to decide a next moving range of the spherical aberration correction device E0 when the error amplitude difference $\Delta A$ or the normalized error amplitude difference $\Delta N$ is newly calculated based on the estimation result obtained by the appropriate position estimation device E7 after the error amplitude difference $\Delta A$ or the normalized error amplitude difference $\Delta N$ most recently calculated is not included in the predefined threshold range (see FIG. 15 illustrating the embodiment, which will be described later). The next moving range decided by the next moving range decision device E8 is inputted to the spherical aberration correction device movement control device E1. The spherical aberration correction device movement control device E1 moves the spherical aberration correction device E0 to the next moving range based on the inputted information.

The focus error amplitude obtaining device E2, error amplitude difference calculation device E3, and appropriate position search control device E4 execute similar processing steps for the next moving range of the spherical aberration correction device E0 to newly calculate the error amplitude difference $\Delta A$ or the normalized error amplitude difference $\Delta N$ in the next moving range of the spherical aberration correction device E0. To calculate the normalized error amplitude difference $\Delta N$, the error amplitude difference normalization device E5 is also put into action.

The similar processing steps are:

a process for moving the spherical aberration correction device E0 to a first measurement position z1';

a process for making the focus error amplitude obtaining device E2 obtain a first amplitude A1' of the focus error signal at the first measurement position z1';

a process for moving the spherical aberration correction device E0 to a second measurement position z2';

a process for making the focus error amplitude obtaining device E2 obtain a second amplitude A2' of the focus error signal at the second measurement position a2';

a process for making the error amplitude difference calculation device E3 calculate an error amplitude difference $\Delta A'$ (A1'−A2' or =A2'−A1');

a process for making the error amplitude difference normalization device E5 normalize the error amplitude difference $\Delta A'$ according to need;

a process for determining whether the error amplitude difference $\Delta A'$ or the normalized error amplitude difference $\Delta N'$ is included in a predefined threshold range;

a process for deciding the first measurement position z1', the second measurement position z2', or an intermediate position between the first measurement position z1' and the second measurement position z2' as an appropriate position of the spherical aberration correction device E0 when the process determines that the error amplitude difference $\Delta A'$ or the normalized error amplitude difference $\Delta N'$ is included in a predefined threshold range.

The appropriate position search control device E4 compares a plus or minus sign of the last error amplitude difference $\Delta A$ or normalized error amplitude difference $\Delta N$ to a plus or minus sign of the current error amplitude difference $\Delta A'$ or normalized error amplitude difference $\Delta N'$. In the case where the compared plus or minus signs are opposite to each other according to a comparison result, the appropriate position search control device E4 determines that the appropriate position of the spherical aberration correction device E0 is included in the new moving range of the spherical aberration correction device E0. The plus or minus signs thus reversed indicates that the amplitude already passed its peak, meaning that the appropriate position of the spherical aberration correction device E0 is included in the new moving range of the spherical aberration correction device E0.

Summarizing the description given so far, the spherical aberration correction appropriate position search apparatus thus technically characterized is the spherical aberration correction appropriate position search apparatus recited in [5, 6] further executing:

a process for deciding a next moving range of the spherical aberration correction device E0 to calculate a next error amplitude difference $\Delta A'$ or normalized error amplitude difference $\Delta N'$ based on information of an estimated appropriate position zp calculated when the error amplitude difference $\Delta A$ or the normalized error amplitude difference $\Delta N$ is not included in the predefined threshold range; and a process for comparing a plus or minus sign of the last error amplitude difference $\Delta A$ or normalized error amplitude difference $\Delta N$ to a plus or minus sign of the current error amplitude difference $\Delta A'$ or normalized error amplitude difference $\Delta N'$ and deciding that the appropriate position of the spherical aberration correction device E0 is included in the new moving range of the spherical aberration correction device E0 when the compared plus or minus signs are opposite to each other according to a comparison result.

Thus configured, when the error amplitude difference $\Delta A$ or normalized error amplitude difference $\Delta N$ calculated once no longer stays in the predefined threshold range afterwards, the moving range of the spherical aberration correction device E0 is newly decided depending on the estimated appropriate position zp calculated based on the error amplitude difference ΔA or normalized error amplitude difference ΔN previously calculated and the relationship. When the plus or minus sign of the error amplitude difference ΔA' or normalized error amplitude difference ΔN' obtained in the new moving range of the spherical aberration correction device E0 is different to the plus or minus code of the error amplitude difference ΔA or normalized error amplitude difference ΔN previously obtained, the appropriate position of the spherical aberration correction device E0 can be easily confirmed. It is unnecessary to repeat any other processes for measurement, only requiring at least two measurements. As a result, it takes even less time to converge the search of the appropriate position of the spherical aberration correction device E0, resulting in further reduction of an overall processing time

[13, 14] A spherical aberration correction appropriate position search method according to the present invention comparable to the spherical aberration correction appropriate position search apparatus recited in [4] is the spherical aberration correction appropriate position search method recited in [11, 12], further comprising:

a tenth step or an 11th step for deciding a next moving range of the spherical aberration correction device E0 to which the spherical aberration correction device E0 is moved to calculate a next error amplitude difference ΔA' or normalized error amplitude difference ΔN' based on the estimation result; and a 11th step or a 12th step for deciding that the appropriate position of the spherical aberration correction device E0 is included in the new moving range of the spherical aberration correction device E0 when the plus or minus sign of the last error amplitude difference ΔA or normalized error amplitude difference ΔN is opposite to the plus or minus sign of the current error amplitude difference ΔA' or normalized error amplitude difference ΔN'.

[15, 16] An optical disc reproduction apparatus or an optical disc recording and reproduction apparatus comprises:

the spherical aberration correction appropriate position search apparatus as claimed in Claim 1;

a light source which irradiates the laser on the optical disc;

the object lens;

the spherical aberration correction device; and a photoelectric detection device configured to receive a reflected light of the laser entering from the optical disc.

Exemplary Embodiment

Figure 5:
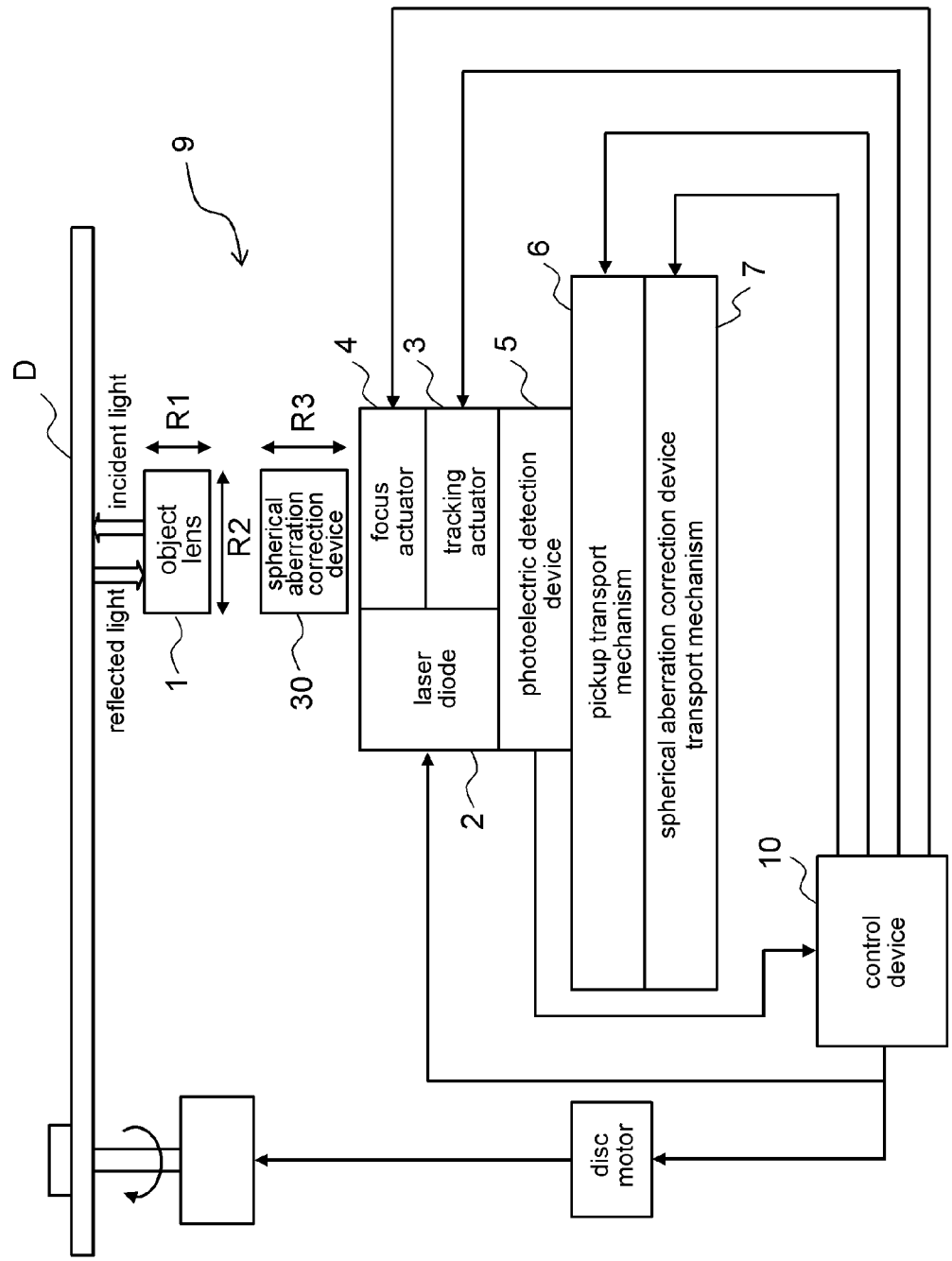
FIG. 5 is a conceptual view of an optical disc recording and reproduction apparatus provided with any of the spherical aberration correction appropriate position search apparatuses according to the present invention.

Hereinafter, an exemplary embodiment of the spherical aberration correction appropriate position search apparatus according to the present invention is described referring to the accompanied drawings. FIG. 5 is a conceptual view of an optical disc recording and reproduction apparatus equipped with the spherical aberration correction appropriate position search apparatus according to the exemplary embodiment.

An optical pickup 9 has an object lens 1, a laser diode 2 which emits a laser light irradiated on an optical disc D through the object lens 1, a tracking actuator 3 configured to perform tracking by adjusting a position of the optical disc D in a track direction thereof (direction illustrated with arrowed line R2) relative to the object lens 1, a focus actuator 4 configured to adjust a focal point of a reflected light entering through the object lens 1 by adjusting a position of the optical disc D in a focus direction thereof (direction illustrated with arrowed line R1) relative to the object lens 1, a photoelectric detection device 5 configured to convert the reflected light entering through the object lens 1 into a light-reception signal and transmit the light-reception signal to a control device 10, a pickup transport mechanism 6 configured to move a body of the optical pickup 9 in the track direction of the optical disc D for track jump, and a spherical aberration correction device transport mechanism 7. The spherical aberration correction device transport mechanism 7 moves a spherical aberration correction device 30 toward or away from the object lens 1 between the laser diode 2 and the object lens 1 (direction illustrated with arrowed line R3) to thereby correct the spherical aberration of the object lens 1. The photoelectric detection device 5 converts the reflected light entering through the object lens 1 into the light-reception signal and transmits the light-reception signal to the control device 10, and also obtains amplitudes of a focus error signal indicating a distance between a laser focal point by the object lens 1 and a signal recording surface of the optical disc D.

The pickup transport mechanism 6 and the spherical aberration correction device transport mechanism 7 are each equipped with a thread motor for moving the body. The control device 10 transmits a drive signal to the pickup transport mechanism 6 and the spherical aberration correction device transport mechanism 7. Comparing the structural elements to those illustrated in FIG. 4, the spherical aberration correction device 30 corresponds to the spherical aberration correction device E0, the spherical aberration correction device transport mechanism 7 corresponds to the spherical aberration correction device movement control device E1, the photoelectric detection device 5 corresponds to the focus error amplitude obtaining device E2, and the control device 10 corresponds to the error amplitude difference calculation device E3, appropriate position search control device E4, error amplitude difference normalization device E5, relationship retention device E6, appropriate position estimation device E7, and the next moving range decision device E8.

Figure 6:
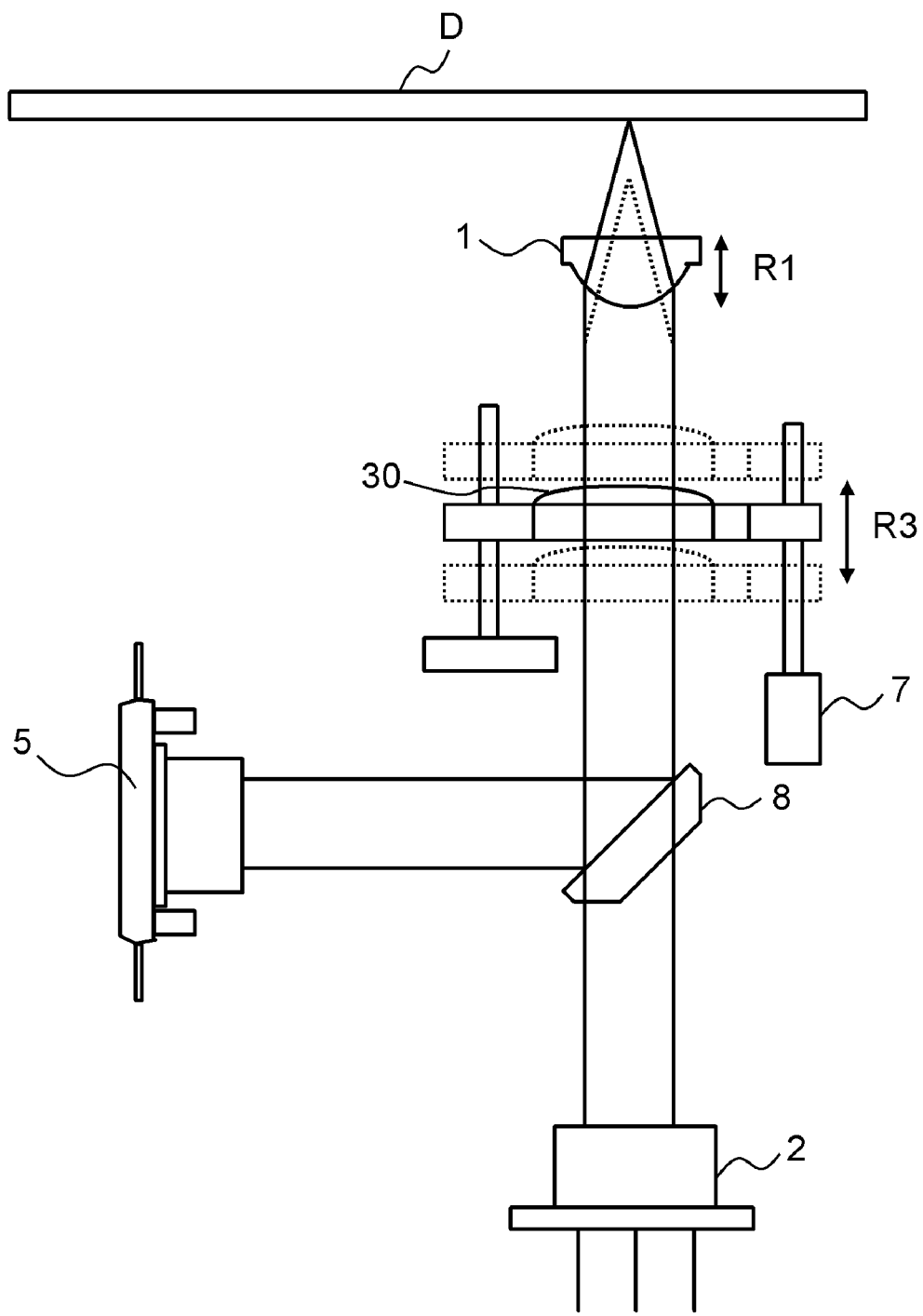
FIG. 6 is a detailed drawing of a technical feature associated with focus drive of an optical pickup and an object lens according to an exemplary embodiment of the present invention.

FIG. 6 is a detailed drawing of a technical feature associated with focus drive of the optical pickup 9 and the object lens 1. The laser light emitted from the laser diode 2 enters the spherical aberration correction device 30 through a half mirror 8. When the laser light thus transmits through the spherical aberration correction device 30, the spherical aberration of the object lens 1 generated in a laser spot of the laser light is corrected. Then, the laser light transmits through the object lens 1 so that the laser light converges to a focal point (laser spot). The object lens 1 can be moved upward and downward by the focus actuator 4. The reflected light of the laser from the optical disc can be obtained at a position of the object lens 1 where the focal point of the laser light exactly overlaps on a reflective layer of the optical disc D. The obtained reflected light enters the photoelectric detection device 5 through the half mirror 8, and the reflected light is then converted into the light-reception signal by the photoelectric detection device 5. The spherical aberration correction device transport mechanism 7 includes a stepping motor. When the motor is rotated, the spherical aberration correction device 30 can reciprocate along an optical path.

Figure 7:
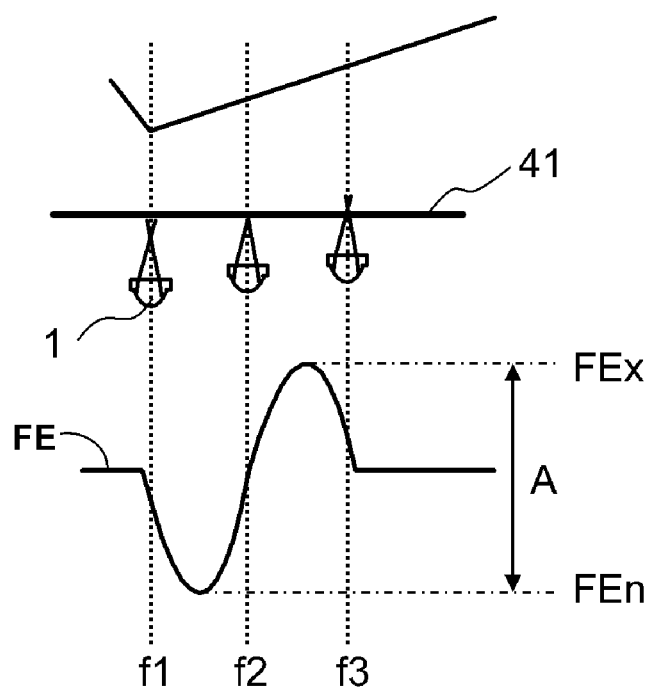
FIG. 7 is an illustration of a process for obtaining amplitudes of a focus error signal according to the exemplary embodiment.

FIG. 7 is an illustration of a process for obtaining amplitudes of a focus error signal FE obtained by the photoelectric detection device 5. At a position f1 of the object lens 1 where the reflected light of the laser spot coming from a recording surface 41 of the optical disc D arrives, the focus error signal FE is outputted in a minus direction. At a position f2 of the object lens f2 where the laser spot arrives at the recording surface 41, the focus error signal FE starts to be outputted in a plus direction. At a position f3 of the object lens 1 where the laser spot is farthest from the recording surface 41, the focus error signal FE is no longer outputted. An amplitude A of the focus error signal FE obtained then is a difference between a maximum value FEx and a minimum value FEn of the focus error signal FE. A focus balance FB is a difference between absolute values of the maximum value FEx and the minimum value FEn of the focus error signal FE (FE=|FEx|−|FEn|).

Figure 8:
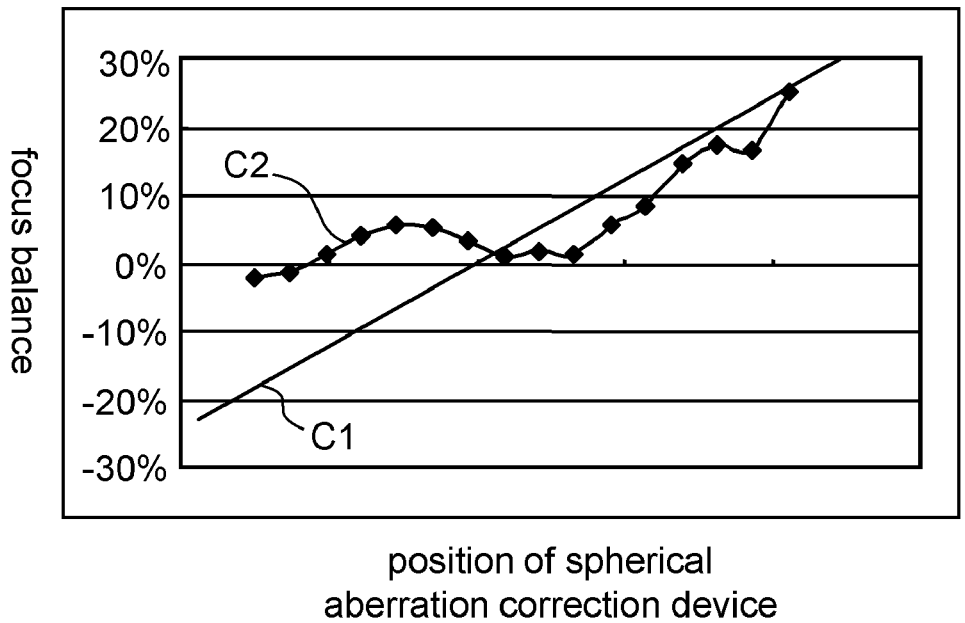
FIG. 8 is an illustration of characteristics of correlation between focus balance and spherical aberration according to the exemplary embodiment.

FIG. 8 is an illustration of characteristics of correlation between the focus balance FB and the spherical aberration, more specifically illustrating ideal linear characteristics C1 and characteristics C2 actually obtained from the optical disc recording and reproduction apparatus. In any optical disc recording and reproduction apparatus which meets the ideal characteristics C1, the spherical aberration can be estimated by the focus balance. In any optical disc recording and reproduction apparatus failing to meet the ideal characteristics C1 but meeting the actual characteristics C2, the spherical aberration cannot be determined from the focus balance. Therefore, it is not possible to uniquely decide a value of the spherical aberration equivalent to 0% which is a point of decision.

Figure 9:
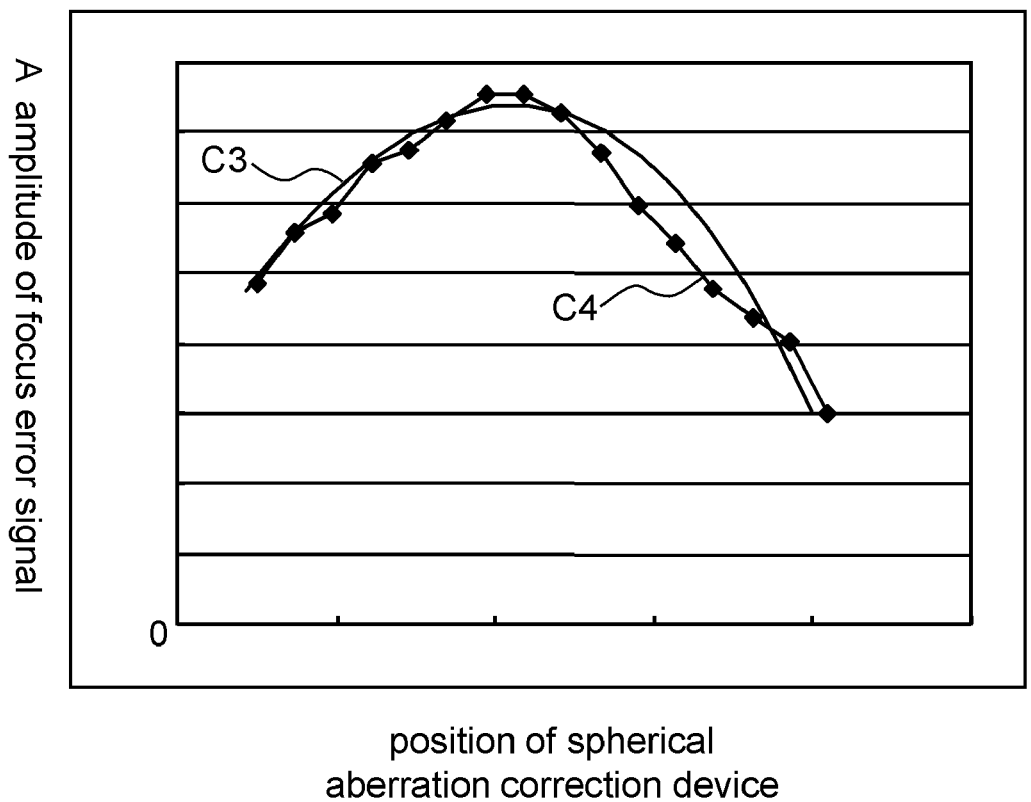
FIG. 9 is an illustration of ideal characteristics of correlation between amplitudes of a focus error signal and spherical aberration, and characteristics actually obtained from the optical disc recording and reproduction apparatus according to the exemplary embodiment.

FIG. 9 illustrates the amplitude A of the focus error signal (hereinafter, abbreviated to error signal amplitude A), ideal characteristics C3 of the spherical aberration, and characteristics C4 actually obtained from the optical disc recording and reproduction apparatus measured under the same conditions as the illustration of FIG. 8. It is known from the illustration that an optical disc recording and reproduction apparatus failing to meet the ideal characteristics based on the focus balance almost meets the ideal characteristics based on the error signal amplitude, meaning that the spherical aberration value corresponding to a peak, which is a point of decision, can be uniquely decided.

Next, temperature-dependent influences are described. FIG. 10 illustrates characteristics C5 of correlation between the error signal amplitudes A at normal temperature and positions z of the spherical aberration correction device 30. The normal temperature is generally about 25° C. Conventionally, an appropriate position z0 of the spherical aberration correction device 30 at suitable temperatures can be known beforehand. Therefore, an initial position for the spherical aberration position is z0. First, the spherical aberration correction device 30 is moved from the spherical aberration position z0 to a first measurement position z1 to obtain a first error signal amplitude A1 by way of the photoelectric detection device 5. Then, the spherical aberration correction device 30 is moved to a second measurement position z2 to obtain a second error signal amplitude A2. At normal temperature, an error amplitude difference ΔA between the first error signal amplitude A1 and the second error signal amplitude A2 (A1−A2) stays within a predefined threshold range. As far as the error amplitude difference ΔA stays within the predefined threshold range, it can be determined that the appropriate position of the spherical aberration correction device 30 is present between the first measurement position z1 and the second and second measurement position z2 because a peak, which is a point of decision, is present between the first and second measurement positions z1 and z2. Therefore, the appropriate position can be decided very accurately as far as the error amplitude difference ΔA is included in the predefined threshold range.

FIG. 11 is an illustration of characteristics C6 of correlation between the error signal amplitudes A and the positions z of the spherical aberration correction device 30 at any temperatures but normal temperature. In the event of temperature changes higher or lower than normal temperature, an error amplitude difference ΔA between a first error signal amplitude A3 obtained at the first measurement position z1 and a second error signal amplitude A4 obtained at the second measurement position z2 increases. Then, it can be determined that the appropriate position of the spherical aberration correction device 30 is not present between the first measurement position z1 and the second and second measurement position z2. Unless the error amplitude difference ΔA stays within the predefined threshold range, a peak, which is a point of decision, is not present between the first measurement position z1 and the second and second measurement position z2, failing to decide the appropriate position. In that case, it becomes necessary to repeat the measurement at different measurement positions. Thus, there is some problem in the characteristics of correlation between the error signal amplitudes A and the positions z of the spherical aberration correction device 30 at temperatures other than normal temperature.

Below is described a method for deciding the appropriate position when the peak decision point is not present between the first and second measurement positions z1 and z2. The method uses characteristics when a degree of light reflection, which is an influential factor, is high and low. Conventionally, it requires a simple subtraction to obtain the error amplitude difference ΔA per se, however, the spherical aberration is not very accurate when the error amplitude difference ΔA is simply obtained from the subtraction because the error amplitude difference ΔA replies upon not only the spherical aberration but also other factors, for example, light reflection of the optical disc and laser power.

Figure 12:
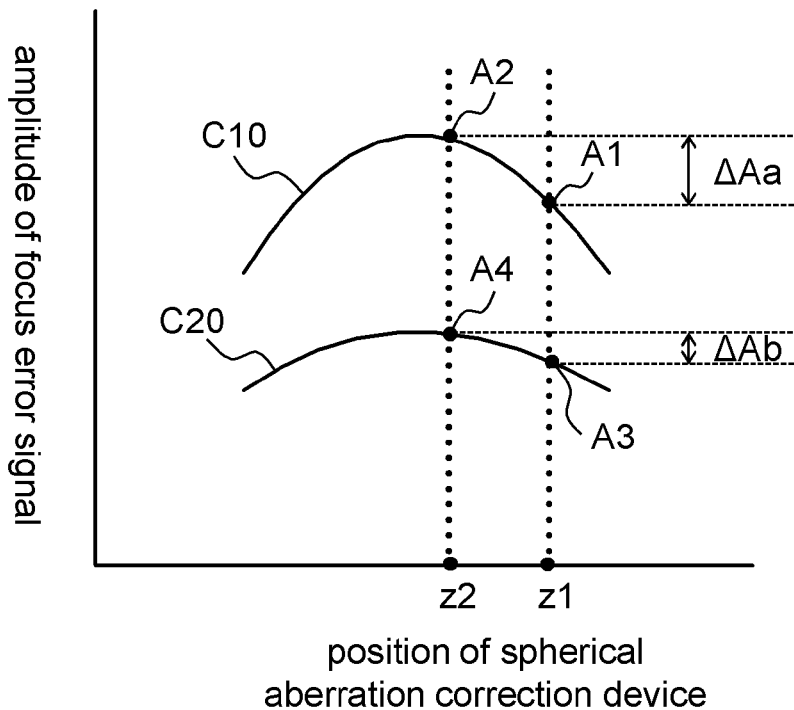
FIG. 12 is an illustration of characteristics of correlation between amplitudes of a focus error signal and positions of a spherical aberration correction device in an optical disc having a high degree of reflection and an optical disc having a low degree of reflection according to the exemplary embodiment.

FIG. 12 is an illustration of characteristics of correlation between the error signal amplitudes A and the positions z of the spherical aberration correction device 30, more specifically illustrating characteristics C10 of an optical disc having a high degree of light reflection and characteristics 20 of an optical disc having a low degree of light reflection. The error amplitude difference ΔA between the first error signal amplitude A1 when moved to the first measurement position 1 and the second error signal amplitude A2 obtained when moved to the second measurement position z2 in the optical disc having a high degree of light reflection is called an error amplitude difference ΔAa. The error amplitude difference ΔA between the first error signal amplitude A3 when moved to the first measurement position 1 and the second error signal amplitude A4 obtained when moved to the second measurement position z2 in the optical disc having a low degree of light reflection is called an error amplitude difference ΔAb. Then, the error amplitude difference ΔA simply obtained from the subtraction is expressed by the following calculation formulas.

$$\Delta Aa = A1 - A2 \qquad 2)$$

$$\Delta Ab = A3 - A4 \qquad 3)$$

The error amplitude difference ΔAa of the optical disc having a high degree of light reflection has a large value. Therefore, it can be determined by the method described earlier that the spherical aberration correction device 30 is not positioned at the appropriate position when the error amplitude difference ΔAa has a large value (see FIG. 11).

On the other hand, the error amplitude difference ΔAb of the optical disc having a low degree of light reflection has a small value. Though the method decides that the spherical aberration correction device 30 is positioned at the appropriate position according to the method, (see FIG. 10), the spherical aberration correction device 30 is actually not positioned at the appropriate position. Thus, the decision is incorrect.

The wrong decision can be prevented from happening when the error amplitude difference ΔA is normalized. More specifically, the error amplitude difference ΔA is divided by an overall degree of reflection. The overall degree of reflection may be a total amount of light detected by the photoelectric detection device 5 or focus error amplitude. Below is described the normalization using the focus error amplitude.

When the normalized error amplitude difference of the optical disc having a high degree of reflection is called $\Delta Na$, and the normalized error amplitude difference of the optical disc having a low degree of reflection is called $\Delta Nb$, the respective normalized amplitude differences are expressed by the following calculation formulas.

$$\Delta Na = (A1-A2)/(A1+A2) \quad \quad 4)$$

$$\Delta Nb = (A3-A4)/(A3+A4) \quad \quad 5)$$

When the respective error amplitude differences are thus normalized, $\Delta Na$ and $\Delta Nb$ can improve a degree of linearity. As a result, the spherical aberration can be accurately expressed.

FIG. 13 is an illustration of characteristics of correlation between the normalized amplitude difference $\Delta N$ and the positions z of the spherical aberration correction device 30. The calculation of the error amplitude difference $\Delta A$ is substantially equal to differentiation of the error amplitude difference $\Delta A$. There is a relationship represented by a quadratic curve between the amplitudes A of the focus error signal FE and the positions z of the spherical aberration correction device 30. Therefore, the normalized amplitude difference $\Delta N$ substantially equal to a differentiated value can be expressed as a primary straight line. As a result of the normalization, there is not a large difference between the characteristics C30 of the normalized error amplitude difference $\Delta N$ of the optical disc having a high degree of reflection and the characteristics C40 of the normalized error amplitude difference $\Delta N$ of the optical disc having a low degree of reflection. Therefore, the spherical aberration can be more accurately expressed. When a tilt m of an approximate expression C35 of these straight lines is calculated in advance, the appropriate position of the spherical aberration correction device 30 can be estimated depending on the value of the normalized amplitude difference $\Delta N$. A threshold range TH used to determine whether the focus operation has any problem should be such a numeral range that can decide whether the spherical aberration is not as large as any problem occurs in the focus error.

FIG. 14 illustrates characteristics C50 in which the error amplitude difference $\Delta A$ of the characteristics C5 at normal temperature illustrated in FIG. 10 is normalized to obtain the normalized amplitude difference $\Delta N$ and characteristics C60 in which the error amplitude difference $\Delta A$ of the characteristics C6 at any temperatures but normal temperature illustrated in FIG. 11 is normalized to obtain the normalized amplitude difference $\Delta N$. A normalized error amplitude difference $\Delta N1$ corresponds to the error amplitude difference between the first error signal amplitude A1 and the second error signal amplitude A2 at the spherical aberration position Z0 illustrated in FIG. 10 (A1−A2). A normalized error amplitude difference $\Delta N2$ corresponds to the error amplitude difference between the first error signal amplitude A3 and the second error signal amplitude A4 at the spherical aberration position Z0 illustrated in FIG. 11 (A3−A4). As is known from the drawing, the temperature variation may largely change sections of the primary expression but does not largely change the tilt of the primary expression. The characteristics C50 shifted in parallel substantially overlap the characteristics C60. Below is given a more detailed description.

First, the normalized error amplitude difference $\Delta N$ at the spherical aberration position Z0 is obtained. At normal temperature, the normalized error amplitude difference $\Delta N1$ is obtained. Since the normalized error amplitude difference $\Delta N1$ is included in the threshold range TH, the spherical aberration position z0 is determined as the appropriate position. At any temperatures but normal temperature, the normalized error amplitude difference $\Delta N2$ is obtained. Since the normalized error amplitude difference $\Delta N2$ is not included in the threshold range TH, it is determined that the spherical aberration correction device 30 should be positionally corrected. Because the tilt m of the approximate expression is already known, how distant the spherical aberration position z0 where the normalized error amplitude difference $\Delta N$ is "0" can be estimated.

When the estimated position of the spherical aberration correction device 30 is called zp, the normalized error amplitude difference $\Delta N2$ is called Dif, the current position of the spherical aberration correction device 30 is called z0, and the tilt m of the approximate expression is called m, the following calculation formula 6) is used to estimate the spherical aberration position zp.

$$zp = z0 + (Dif/m) \quad \quad 6)$$

The spherical aberration correction device 30, when moved to the estimated position zp, may be close to the appropriate position. However, the tilt m of the approximate expression is merely a mean tilt. To accurately determine whether it is really the appropriate position, therefore, it is necessary to measure again the normalized error amplitude difference $\Delta N$ when the spherical aberration correction device 30 arrives at the spherical aberration position zp. When the normalized error amplitude difference $\Delta N$ measured again is included in the threshold range TH, the position at the time can be decided as the appropriate position. If not included in the threshold range TH, the spherical aberration position is estimated again from the tilt m of the approximate expression, and the spherical aberration correction device 30 is moved there until an appropriate spherical aberration position is obtained.

FIG. 15 is an illustration of characteristics C70 of the normalized error amplitude difference $\Delta N$ in an environment with a tilt more variable than the tilt m of the approximate expression. When the spherical aberration position z at which the normalized error amplitude difference $\Delta N$ is "0" is estimated by the method described earlier and a normalized error amplitude difference $\Delta N3$ is obtained after the spherical aberration correction device 30 is moved by an estimated distance, the normalized error amplitude difference $\Delta N3$ is possibly beyond the threshold range TH. When the normalized error amplitude difference $\Delta N3$ is not included in the threshold range TH and its plus or minus sign is opposite to that of the last normalized error amplitude difference $\Delta N2$, it can be determined that there is an appropriate spherical aberration position between the spherical aberration position z0 and the spherical aberration position zp. In that case, an intermediate position between the spherical aberration position z0 and the spherical aberration position zp may be decided as the appropriate spherical aberration position, or a primary approximate expression of the characteristics C70 may be obtained from the normalized error amplitude differences $\Delta N2$ and $\Delta N3$ at the spherical aberration position z0 and the spherical aberration position zp to decide a position where the primary approximate expression results in "0" as the appropriate spherical aberration position.

Figure 16:
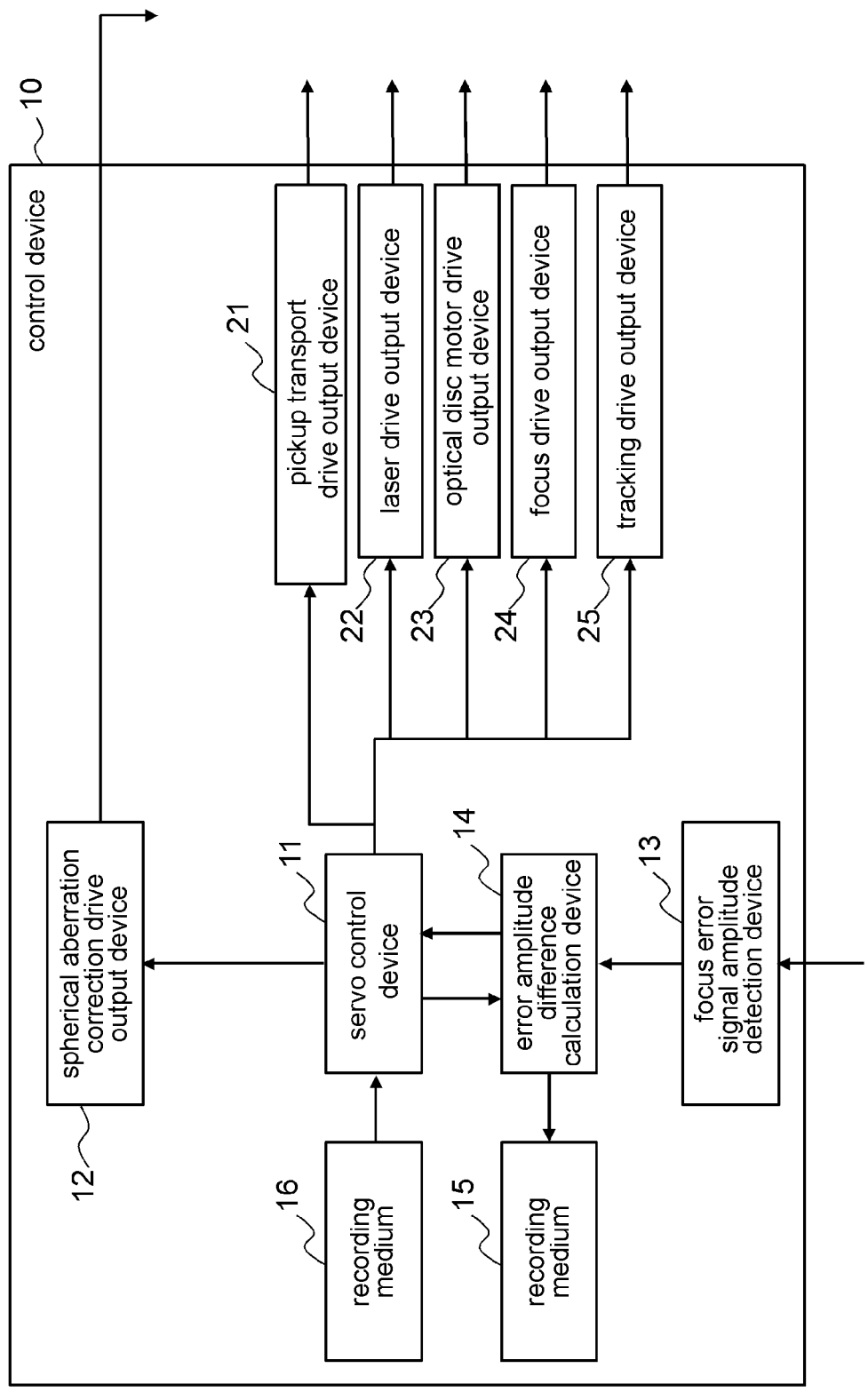
FIG. 16 is a block diagram illustrating an overall structure of a control device according to the exemplary embodiment.

FIG. 16 is a block diagram illustrating an overall structure of the control device 10. When the optical disc D is mounted, a servo control device 11 instructs a spherical aberration correction drive output device 12 to move the spherical aberration correction device 30 to a first position to obtain the first amplitude A1 of the focus error signal. The spherical aberration correction drive output device 12 outputs a signal to drive the spherical aberration correction device 30. The servo control device 11 corresponds to the appropriate position search control device E4, and the spherical aberration correction drive output device 12 corresponds to the spherical aberration correction device movement control device E1, respectively illustrated in FIG. 1. After the signal is outputted, the object lens 1 is moved in the R1 direction by a focus drive output device 24. An amount of reflected light detected by the photoelectric detection device 5 is inputted to a focus error signal amplitude detection device 13, and the focus error signal amplitude detection device 13 detects the first amplitude A1 of the focus error signal FE. The focus error signal amplitude detection device 13 corresponds to the focus error amplitude obtaining device E2 illustrated in FIG. 1. An error amplitude difference calculation device 14 checks the amplitude detected by the focus error signal amplitude detection device 13 and temporarily stores the detected amplitude in a recording medium 15. The error amplitude difference calculation device 14 corresponds to the error amplitude difference calculation device E3 and the appropriate position search control device E4 illustrated in FIG. 1.

The servo control device 11 moves the spherical aberration correction device 30 to a second position to obtain the second amplitude A2 of the focus error signal and measures the second amplitude A2. The error amplitude difference calculation device 14 calculates a first normalized error amplitude difference $\Delta N_1$ from the first amplitude A1 and the second amplitude A2 of the focus error signal temporarily stored in the recording medium 15, and stores the calculated first normalized error amplitude difference $\Delta N_1$ in the recording medium 15. A recording medium 16 stores therein the tilt m of the approximate expression calculated beforehand. The servo control device 11 obtains the first normalized error amplitude difference $\Delta N_1$ calculated by the error amplitude difference calculation device 14 and confirms whether the first normalized error amplitude difference $\Delta N_1$ is included in the threshold range TH. The servo control device 11 corresponds to the appropriate position search control device E4 illustrated in FIG. 1. When the first normalized error amplitude difference $\Delta N_1$ is included in the threshold range TH, an intermediate position between the first and second positions can be decided as the appropriate position. Therefore, the serve control device 11 moves the spherical aberration correction device 30 to the intermediate position between the first and second positions. Then, the processing steps are over.

When the first normalized error amplitude difference $\Delta N_1$ is not included in the threshold range TH, the servo control device 11 obtains the tilt m of the approximate expression and estimates the appropriate position of the spherical aberration correction device 30 based on the tilt m and instructs the spherical aberration correction drive output device 12 to move the spherical aberration correction device 30 to the estimated position. After the spherical aberration correction device 30 is moved, a second normalized error amplitude difference $\Delta N_2$ is similarly obtained and stored in the recording medium 15, and then confirmed whether the second normalized error amplitude difference $\Delta N_2$ is included in the threshold range TH. Thus, the second normalized error amplitude difference $\Delta N$ continuously calculated until it stays within the threshold range. After the processing steps are over, the servo control device 11 controls a pickup transport drive output device 21, a laser drive output device 22, an optical disc motor drive output device 23, a focus drive output device 24, and a tracking drive output device 25 to read data from the optical disc D.

Figure 17:
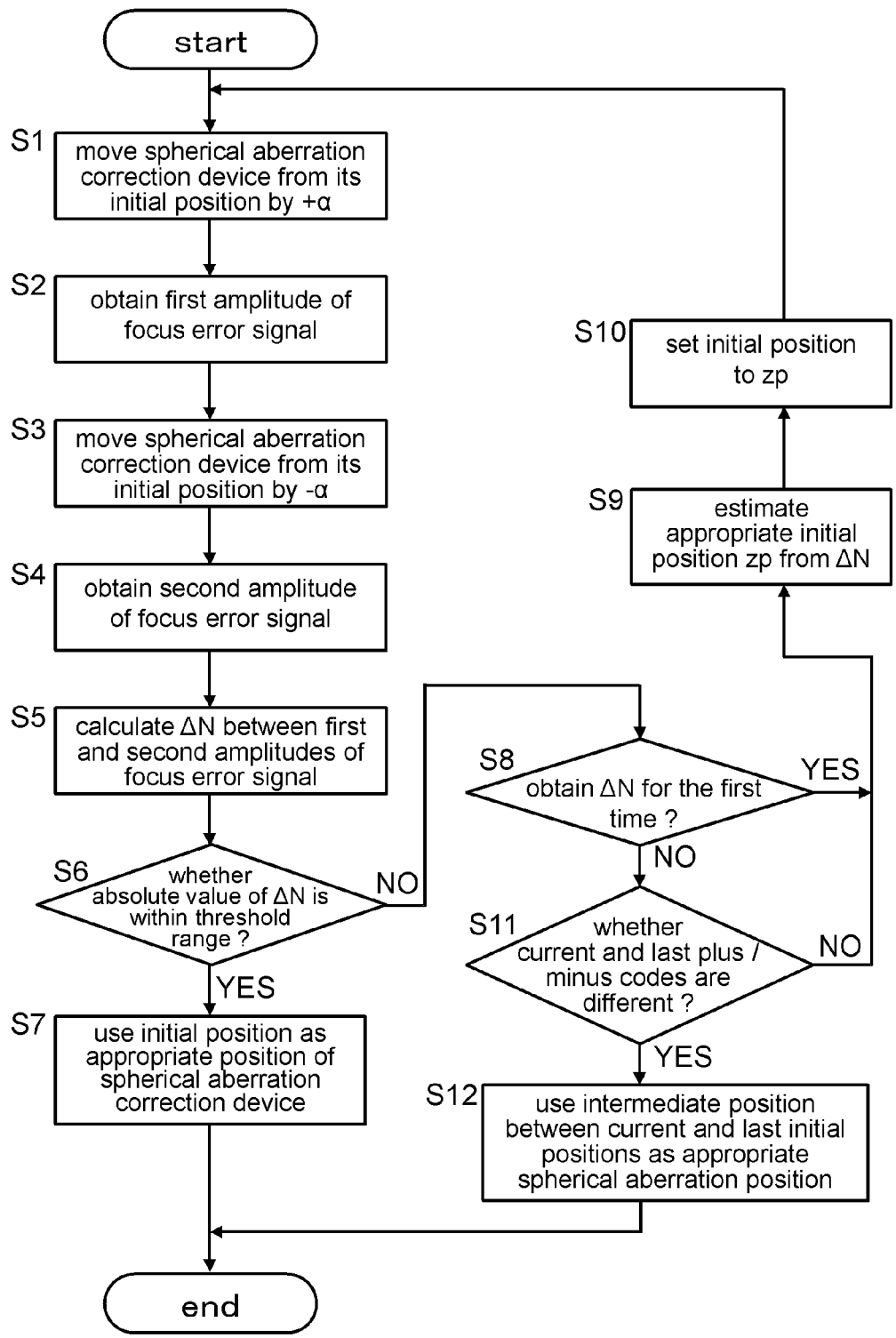
FIG. 17 is a flow chart illustrating a control operation of the control device provided in the spherical aberration correction appropriate position search apparatus.

FIG. 17 is a flow chart illustrating the control operation of the control device provided in the spherical aberration correction appropriate position search apparatus according to the exemplary embodiment. When the optical disc D is mounted, the operation starts with Step S1.

In Step S1, the spherical aberration correction device 30 is moved to a position away by $+\alpha$ from its initial position. In Step S2, the first amplitude A1 of the focus error signal FE is measured. In Step S3, the spherical aberration correction device 30 is moved to a position away by $-\alpha$ from its initial position. In Step S4, the second amplitude A2 of the focus error signal FE is measured. In Step S5, the error amplitude difference $\Delta$ between the first and second amplitudes A1 and A2 of the focus error signal measured in Step S2 and Step S4 is calculated and then normalized to obtain the normalized error amplitude difference $\Delta N$. In Step S6, it is determined whether the normalized error amplitude difference $\Delta N$ is included in the threshold range TH illustrated in FIG. 14. The initial position is possibly close to the appropriate position of the spherical aberration correction device 30, in which case the normalized error amplitude difference $\Delta N$ has such a small value that is included in the threshold range TH. Then, the operation proceeds to Step S7, in which the initial position is decided as the appropriate position of the spherical aberration correction device 30.

When determined in Step S6 that the normalized error amplitude difference $\Delta N$ is not included in the threshold range TH illustrated in FIG. 14. the operation proceeds to Step S8, in which it is determined whether the normalized error amplitude difference $\Delta N$ was obtained for the first time. When Step S8 determines that the normalized error amplitude difference $\Delta N$ is obtained for the first time, the operation proceeds to Step S9, in which the appropriate initial position zp is estimated from the calculation formula 6) based on the normalized error amplitude difference $\Delta N$. Then, the initial position is updated in Step S10.

When determined in Step S8 that the normalized error amplitude difference $\Delta N$ was obtained for the second time or thereafter, the operation proceeds to Step S11, in which it is determined whether the plus or minus sign of the normalized error amplitude difference $\Delta N$ previously obtained is different to the plus or minus sign of the normalized error amplitude difference $\Delta$ most recently obtained. The plus or minus sign is information indicating whether the normalized error amplitude difference $\Delta N$ shows a positive value or a negative value. In the case where the plus or minus sign is reversed, the spherical aberration correction device 30 has passed the appropriate spherical aberration position. Therefore, the operation proceeds to Step S12, in which an intermediate position between the initial position previously obtained and the updated initial position is used as the appropriate spherical aberration position.

Thus, the appropriate position of the spherical aberration correction device 30 can be determined and decided with at least two measurements, which requires no temperature sensor. Though the appropriate position thus measured is not very precise, such a positional adjustment is useful before the focus operation starts and information has not been read from the optical disc. Therefore, it is unnecessary for the appropriate position of the spherical aberration correction device 30 to be very precise, and the spherical aberration should be corrected to such an extent that does not cause any problem in the focus operation. The point of importance is to confirm whether the current position is largely away from the appropriate position. The apparatus and the method disclosed in this specification are suitable means for positional adjustment when the focus operation has not been carried out yet.

INDUSTRIAL APPLICABILITY

The present invention uses an error amplitude difference between amplitudes of a focus error signal obtained at two different positions to search an appropriate position of a spherical aberration correction device, thereby correcting spherical aberration with a higher accuracy. The present invention provides an advantageous technology for a spherical aberration correction appropriate position search apparatus provided in an optical disc reproduction apparatus or an optical disc recording and reproduction apparatus.

DESCRIPTION OF REFERENCE SYMBOLS

D optical disc
E0 spherical aberration correction device
E1 spherical aberration correction device movement control device
E2 focus error amplitude obtaining device
E3 error amplitude difference calculation device
E4 appropriate position search control device
E5 error amplitude difference normalization device
E6 relationship retention device
E7 appropriate position estimation device
E8 next moving range decision device
1 object lens
2 laser diode (light source)
5 photoelectric detection device
7 spherical aberration correction device transport mechanism
10 control device

What is claimed is:

1. A spherical aberration correction appropriate position search apparatus, comprising:
   a spherical aberration correction device movement control device configured to control movement of a spherical aberration correction device for correcting spherical aberration of an object lens which collects a laser on an optical disc by moving toward or away from the object lens;
   a focus error amplitude obtaining device configured to obtain amplitudes of a focus error signal indicating a distance between a focal point of the laser by the object lens and a signal recording surface of the optical disc;
   an error amplitude difference calculation device configured to calculate an error amplitude difference which is a difference between the amplitudes of the focus error signal obtained by the focus error amplitude obtaining device at two different positions in a moving range of the spherical aberration correction device; and
   an appropriate position search control device in charge of overall control of the spherical aberration correction device movement control device, the focus error amplitude obtaining device, and the error amplitude difference calculation device, wherein
   the appropriate position search control device decides an appropriate position of the spherical aberration correction device based on the error amplitude difference.

2. The spherical aberration correction appropriate position search apparatus as claimed in claim 1, wherein
   the appropriate position search control device is configured to execute:
   a first process for making the spherical aberration correction device movement control device move a spherical aberration correction device to a first measurement position;
   a second process for making the focus error amplitude obtaining device obtain a first amplitude of the focus error signal when the spherical aberration correction device is positioned at the first measurement position;
   a third process for making the spherical aberration correction device movement control device move the spherical aberration correction device to a second measurement position;
   a fourth process for making the focus error amplitude obtaining device obtain a second amplitude of the focus error signal when the spherical aberration correction device is positioned at the second measurement position;
   a fifth process for making the error amplitude difference calculation device calculate an error amplitude difference which is a difference between the first amplitude and the second amplitude;
   a sixth process for determining whether the error amplitude difference is included in a predefined threshold range;
   a seventh process for making the spherical aberration correction device movement control device displace at least one of the first measurement position and the second measurement position when the sixth process determines that the error amplitude difference is not included in the predefined threshold range and then repeating the first-sixth processes; and
   an eighth process for deciding the first measurement position, the second measurement position, or an intermediate position between the first measurement position and the second measurement position as the appropriate position of the spherical aberration correction device when the sixth process determines that the error amplitude difference is included in the predefined threshold range.

3. The spherical aberration correction appropriate position search apparatus as claimed in claim 1, further comprising an error amplitude difference normalization device configured to normalize the error amplitude difference to obtain a normalized error amplitude difference, wherein
   the appropriate position search control device decides the appropriate position of the spherical aberration correction device based on the normalized error amplitude difference.

4. The spherical aberration correction appropriate position search apparatus as claimed in claim 3, wherein
   the appropriate position search control device is configured to execute:
   a first process for making the spherical aberration correction device movement control device move the spherical aberration correction device to a first measurement position;
   a second process for making the focus error amplitude obtaining device obtain a first amplitude of the focus error signal when the spherical aberration correction device is positioned at the first measurement position;
   a third process for making the spherical aberration correction device movement control device move the spherical aberration correction device to a second measurement position;
   a fourth process for making the focus error amplitude obtaining device obtain a second amplitude of the focus error signal when the spherical aberration correction device is positioned at the second measurement position;
   a fifth process for making the error amplitude difference calculation device calculate an error amplitude difference which is a difference between the first amplitude and the second amplitude;

a sixth process for making the error amplitude difference normalization device normalize the error amplitude difference;

a seventh process for determining whether the normalized error amplitude difference obtained in the sixth process is included in a predefined threshold range;

an eighth process for displacing at least one of the first measurement position and the second measurement position when the seventh process determines that the normalized error amplitude difference is not included in the predefined threshold range and then repeating the first-seventh processes; and a ninth process for deciding the first measurement position, the second measurement position, or an intermediate position between the first measurement position and the second measurement position as the appropriate position of the spherical aberration correction device when the seventh process determines that the normalized error amplitude difference is included in the predefined threshold range.

5. The spherical aberration correction appropriate position search apparatus as claimed in claim 1, further comprising:

a relationship retention device configured to retain beforehand a relationship of the appropriate position of the spherical aberration correction device relative to the error amplitude difference at normal temperature; and an appropriate position estimation device configured to estimate the appropriate position of the spherical aberration correction device based on the relationship whenever the error amplitude difference is not included in the predefined threshold range.

6. The spherical aberration correction appropriate position search apparatus as claimed in claim 3, wherein a relationship retention device configured to retain beforehand a relationship of the error amplitude difference at normal temperature relative to the appropriate position of the spherical aberration correction device in the error amplitude difference at normal temperature; and an appropriate position estimation device configured to estimate the appropriate position of the spherical aberration correction device based on the relationship whenever the error amplitude difference is not included in the predefined threshold range.

7. The spherical aberration correction appropriate position search apparatus as claimed in claim 5, further comprising a next moving range decision device configured to decide a next moving range of the spherical aberration correction device when the error amplitude difference is newly calculated, wherein the appropriate position search control device compares a plus or minus sign of the last error amplitude difference to a plus or minus sign of the current error amplitude difference, and determines that the appropriate position of the spherical aberration correction device is included in the new moving range decided by the next moving range decision device when the compared plus or minus signs are opposite to each other.

8. The spherical aberration correction appropriate position search apparatus as claimed in claim 6, further comprising a next moving range decision device configured to decide a next moving range of the spherical aberration correction device when the normalized error amplitude difference is newly calculated, wherein the appropriate position search control device compares a plus or minus sign of the last normalized error amplitude difference to a plus or minus sign of the current normalized error amplitude difference, and determines that the appropriate position of the spherical aberration correction device is included in the new moving range decided by the next moving range decision device when the compared plus or minus signs are opposite to each other.

9. An optical disc reproduction apparatus, comprising:

the spherical aberration correction appropriate position search apparatus as claimed in claim 1;

a light source which irradiates the laser on the optical disc;

the object lens;

the spherical aberration correction device; and a photoelectric detection device configured to receive a reflected light of the laser entering from the optical disc.

10. An optical disc recording and reproduction apparatus, comprising:

the spherical aberration correction appropriate position search apparatus as claimed in claim 1;

a light source which irradiates the laser on the optical disc;

the object lens;

the spherical aberration correction device; and a photoelectric detection device configured to receive a reflected light of the laser entering from the optical disc.

11. A spherical aberration correction appropriate position search method, comprising:

a first step for moving a spherical aberration correction device to a first measurement position, the spherical aberration correction device being configured to correct spherical aberration of an object lens which collects a laser on an optical disc by moving toward or away from the object lens;

a second step for obtaining a first amplitude of a focus error signal indicating a distance between a focal point of the laser by the object lens and a signal recording surface of the optical disc when the spherical aberration correction device is positioned at the first measurement position;

a third step for moving the spherical aberration correction device to a second measurement position;

a fourth step for obtaining a second amplitude of the focus error signal when the spherical aberration correction device is positioned at a second measurement position;

a fifth step for calculating an error amplitude difference which is a difference between the first and second amplitudes;

a sixth step for determining whether the error amplitude difference is included in a predefined threshold range;

a seventh step for displacing at least one of the first measurement position and the second measurement position when the sixth step determines that the error amplitude difference is not included in the predefined threshold range and then repeating the first-sixth steps; and an eighth step for deciding the first measurement position, the second measurement position, or an intermediate position between the first measurement position and the second measurement position as an appropriate position of the spherical aberration correction device when the sixth step determines that the error amplitude difference is included in the predefined threshold range.

12. The spherical aberration correction appropriate position search method as claimed in claim 11, further comprising a ninth step for retaining beforehand a relationship of the error amplitude difference at normal temperature relative to the appropriate position of the spherical aberration correction device in the error amplitude difference at normal temperature, wherein the seventh step estimates the appropriate position of the spherical aberration correction device based on the relationship to output a feedback of the estimated appropriate position.

13. The spherical aberration correction appropriate position search method as claimed in claim 12, further comprising:
a tenth step for deciding a next moving range of the spherical aberration correction device to which the spherical aberration correction device is moved to newly calculate the error amplitude difference based on the estimation result; and
a 11th step for deciding that the appropriate position of the spherical aberration correction device is included in the new moving range of the spherical aberration correction device when a plus or minus sign of the last error amplitude difference is opposite to a plus or minus sign of the current error amplitude difference.

14. A spherical aberration correction appropriate position search method comprising:
a first step for moving a spherical aberration correction device to a first measurement position, the spherical aberration correction device being configured to correct spherical aberration of an object lens which collects a laser on an optical disc by moving toward or away from the object lens;
a second step for obtaining a first amplitude of a focus error signal indicating a distance between a focal point of the laser by the object lens and a signal recording surface of the optical disc when the spherical aberration correction device is positioned at the first measurement position;
a third step for moving the spherical aberration correction device to a second measurement position;
a fourth step for obtaining a second amplitude of the focus error signal when the spherical aberration correction device is positioned at the second measurement position;
a fifth step for calculating an error amplitude difference which is a difference between the first and second amplitudes;
a sixth step for obtaining a normalized error amplitude difference by normalizing the error amplitude difference;
a seventh step for determining whether the normalized error amplitude difference is included in a predefined threshold range;
an eighth step for displacing at least one of the first measurement position and the second measurement position when the seventh step determines that the normalized error amplitude difference is not included in the predefined threshold range and then repeating the first-seventh steps; and
a ninth step for deciding the first measurement position, the second measurement position, or an intermediate position between the first measurement position and the second measurement position as an appropriate position of the spherical aberration correction device when the seventh step determines that the normalized error amplitude difference is included in the predefined threshold range.

15. The spherical aberration correction appropriate position search method as claimed in claim 14, further comprising a tenth step for retaining beforehand a relationship of the error amplitude difference at normal temperature relative to the appropriate position of the spherical aberration correction device in the error amplitude difference at normal temperature, wherein
the eighth step estimates the appropriate position of the spherical aberration correction device based on the relationship to output a feedback of the estimated appropriate position.

16. The spherical aberration correction appropriate position search method as claimed in claim 15, further comprising:
an 11th step for deciding a next moving range of the spherical aberration correction device to which the spherical aberration correction device is moved to newly calculate the error amplitude difference based on the estimation result; and
a 12th step for deciding that the appropriate position of the spherical aberration correction device is included in the new moving range of the spherical aberration correction device when a plus or minus sign of the last error amplitude difference is opposite to a plus or minus sign of the current error amplitude difference.

* * * * *